United States Patent
Konishiike et al.

(10) Patent No.: US 8,383,267 B2
(45) Date of Patent: Feb. 26, 2013

(54) ANODE AND SECONDARY BATTERY INCLUDING THE SAME

(75) Inventors: Isamu Konishiike, Kanagawa (JP); Kotaro Satori, Kanagawa (JP); Kenichi Kawase, Fukushima (JP); Shunsuke Kurasawa, Fukushima (JP); Koichi Matsumoto, Fukushima (JP); Takakazu Hirose, Fukushima (JP); Masayuki Iwama, Fukushima (JP); Takashi Fujinaga, Fukushima (JP)

(73) Assignee: Sony Corporation, Tokyo (JP)

( * ) Notice: Subject to any disclaimer, the term of this patent is extended or adjusted under 35 U.S.C. 154(b) by 664 days.

(21) Appl. No.: 12/468,975

(22) Filed: May 20, 2009

(65) Prior Publication Data
US 2009/0291371 A1    Nov. 26, 2009

(30) Foreign Application Priority Data
May 23, 2008 (JP) ................................. 2008-135804

(51) Int. Cl.
*H01M 4/58* (2010.01)
(52) U.S. Cl. .................. 429/218.1; 429/231.8; 429/188; 429/199; 429/338; 429/341; 429/323; 429/307; 252/182.1
(58) Field of Classification Search ............... 429/218.1, 429/231.8, 188, 199, 338, 341, 323, 307; 252/182.1
See application file for complete search history.

(56) References Cited

U.S. PATENT DOCUMENTS

| | | | |
|---|---|---|---|
| 6,235,427 B1 | 5/2001 | Idota et al. | |
| 6,605,386 B1 | 8/2003 | Kasamatsu et al. | |
| 2003/0157407 A1 | 8/2003 | Kosuzu et al. | |
| 2004/0241548 A1 | 12/2004 | Nakamoto et al. | |
| 2007/0122701 A1 | 5/2007 | Yamaguchi | |
| 2008/0118844 A1* | 5/2008 | Miyamoto et al. | 429/218.1 |

FOREIGN PATENT DOCUMENTS

| | | |
|---|---|---|
| JP | 2000-036323 | 2/2000 |
| JP | 2000-173585 | 6/2000 |
| JP | 2003-197193 | * 7/2003 |
| JP | 2004-185810 | 7/2004 |
| JP | 2004-319469 | 11/2004 |
| JP | 2004-335334 | 11/2004 |
| JP | 2004-335335 | 11/2004 |
| JP | 2005-183179 | 7/2005 |
| JP | 2007-141666 | 6/2007 |
| JP | 2008-004534 | 1/2008 |

OTHER PUBLICATIONS

Konno et al. "Si-C-O-glass-like compounds as a negative electrode material for Li ion battery", ECS Transactions (2006), 1, 4, (Corrosion and Electrochemistry of Advanced Materials, in Honor of Koji Hashimoto, pp. 509-514.*

* cited by examiner

*Primary Examiner* — Laura Weiner
(74) *Attorney, Agent, or Firm* — SNR Denton US LLP

(57) ABSTRACT

A secondary battery having high cycle characteristics is provided. The secondary battery includes a cathode, an anode, and an electrolyte. In the anode, an anode active material layer containing silicon, carbon, and oxygen as an anode active material is provided on an anode current collector. In the anode active material, a content of carbon is from 0.2 atomic % to 10 atomic % both inclusive, and a content of oxygen is from 0.5 atomic % to 40 atomic % both inclusive. A ratio from 0.1% to 17.29% both inclusive of the silicon contained in the anode active material exists as Si—C bond.

9 Claims, 9 Drawing Sheets

ANODE AND SECONDARY BATTERY INCLUDING THE SAME

BACKGROUND OF THE INVENTION

1. Field of the Invention

The present invention relates to an anode that contains an anode active material containing silicon (Si) as an element and a secondary battery including the anode.

2. Description of the Related Art

In recent years, many portable electronic devices such as a combination camera (video tape recorder), a digital still camera, a mobile phone, a personal digital assistance, and a notebook personal computer have been introduced, and down sizing and weight saving thereof have been made. Accordingly, development of a light-weight secondary battery capable of providing a high energy density as a power source for such electronic devices has been promoted. Specially, a lithium ion secondary battery in which a carbon material is used for the anode, a complex material composed of lithium (Li) and a transition metal is used for the cathode, and ester carbonate is used for an electrolytic solution provides a higher energy density compared to existing lead batteries and nickel cadmium batteries, and thus the lithium ion secondary battery is in practical use widely.

Further, in recent years, as performance of portable electronic devices has been improved, further improvement of the capacity has been demanded. It has been considered that as an anode active material, tin, silicon or the like is used instead of the carbon materials as described in, for example, U.S. Pat. No. 4,950,566. The theoretical capacity of tin is 994 mAh/g, and the theoretical capacity of silicon is 4199 mAh/g, which are significantly larger than the theoretical capacity of graphite 372 mAh/g, and therefore capacity improvement is able to be expected therewith.

However, a tin alloy or a silicon alloy inserting lithium has a high activity. Therefore, there have been disadvantages that an electrolytic solution is easily decomposed, and lithium is easily inactivated. Therefore, when charge and discharge are repeated, charge and discharge efficiency is lowered, and sufficient cycle characteristics may not be obtained.

Therefore, it has been considered that an inert layer is formed on the surface of the anode active material. For example, it has been proposed to form a silicon oxide coat on the surface of the anode active material as described in Japanese Unexamined Patent Application Publication Nos. 2004-171874 and 2004-319469.

Further, the anode active material containing tin, silicon or the like expands and shrinks more largely than an anode active material composed of a carbon material such as graphite due to repetition of charge and discharge. Therefore, collapse of the anode active material itself, separation of the anode active material from the anode current collector and the like may result in deterioration of the cycle characteristics.

To address the foregoing disadvantages, a technique in which the cycle characteristics are improved by adopting an electrode using, as an active material, an amorphous material containing at least one impurity selected from the group consisting of carbon, oxygen, nitrogen, argon, and fluorine together with silicon have been proposed as described in, for example, Japanese Unexamined Patent Application Publication No. 2005-235397. As a technique similar thereto, Japanese Unexamined Patent Application Publication No. 2007-184252 discloses an active material having a composition expressed by general formula $SiC_xO_y$ (x: 0.05 to 0.90, y: 0 to 0.9).

SUMMARY OF THE INVENTION

However, in the case where the silicon oxide coat is provided as in Japanese Unexamined Patent Application Publication Nos. 2004-171874 and 2004-319469, when the thickness thereof is increased, the reaction resistance is increased and the cycle characteristics become insufficient. Thus, in the method of forming the coat composed of silicon oxide on the surface of the highly active anode active material, it has been difficult to obtain sufficient cycle characteristics and thus further improvement has been aspired.

Further, as in Japanese Unexamined Patent Application Publication Nos. 2005-235397 and 2007-184252, even if carbon or oxygen is contained in the active material mainly composed of silicon, in practice, sufficient cycle characteristics may not be obtained in some cases.

In view of the foregoing, in the present invention, it is desirable to provide an anode capable of improving cycle characteristics and a secondary battery using the anode.

According to an embodiment of the invention, there is provided an anode provided with an anode active material layer containing silicon, carbon, and oxygen as an anode active material on an anode current collector. In the anode active material, a content of carbon is from 0.2 atomic % to 10 atomic % both inclusive, and a content of oxygen is from 0.5 atomic % to 40 atomic % both inclusive. A ratio from 0.1% to 17.29% both inclusive of silicon contained in the anode active material exists as Si—C bond.

According to an embodiment of the invention, there is provided a secondary battery including a cathode, an anode, and an electrolyte. In the secondary battery according to the embodiment of the invention, the foregoing anode of the embodiment of the invention is used.

According to the anode of the embodiment of the invention, the certain amount of carbon and the certain amount of oxygen are added to the anode active material layer containing silicon provided on the anode current collector, and the ratio from 0.1% to 17.29% both inclusive of silicon contained in the anode active material exists as Si—C bond. Therefore, the contact force of the anode active material layer to the anode current collector may be improved. Further, the anode active material layer becomes physically rigid. Accordingly, in the case where the anode is used for an electrochemical device such as the secondary battery of the embodiment of the invention, superior cycle characteristics are able to be obtained.

Other and further objects, features and advantages of the invention will appear more fully from the following description.

DETAILED DESCRIPTION OF THE PREFERRED EMBODIMENT

An embodiment of the invention will be hereinafter described in detail with reference to the drawings.

Figure 1:
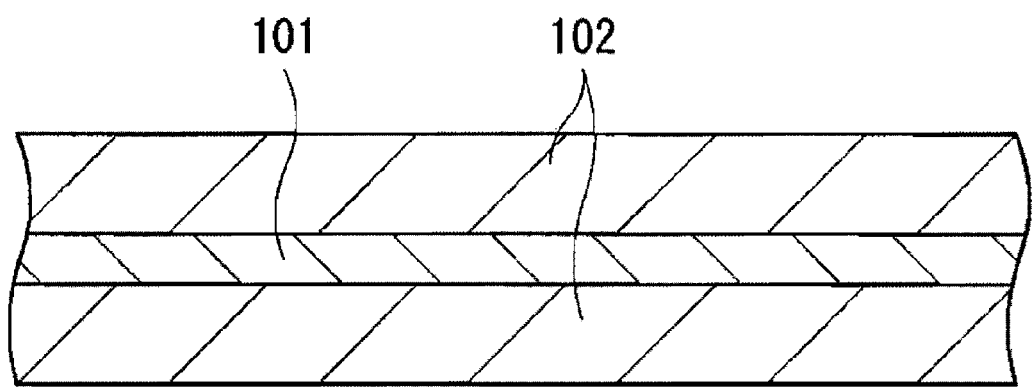
FIG. 1 is a cross sectional view illustrating a structure of an anode according to the embodiment of the invention.

FIG. 1 illustrates a cross sectional structure of an anode according to an embodiment of the invention. The anode is used, for example, for an electrochemical device such as a battery. The anode has an anode current collector 101 having a pair of opposed faces and an anode active material layer 102 provided on the anode current collector 101.

The anode current collector 101 is preferably made of a material having favorable electrochemical stability, favorable electric conductivity, and favorable mechanical strength. Examples of materials include a metal material such as copper (Cu), nickel (Ni), and stainless steel. Specially, copper is preferable since a high electric conductivity is thereby obtainable.

The anode active material layer 102 contains an anode material containing all of silicon (Si), carbon (C), and oxygen (O) capable of inserting and extracting an electrode reactant as an anode active material, and may also contain an electrical conductor, a binder or the like according to needs. Silicon has a high ability to insert and extract lithium, and is able to provide a high energy density. The anode active material layer 102 may be provided on both faces of the anode current collector 101, or may be provided on a single face of the anode current collector 101.

Examples of anode materials containing all of silicon, carbon, and oxygen include a mixture of a silicon compound containing carbon (for example, SiC) and a silicon compound containing oxygen (for example, $Si_2N_2O$, $SiO_v$ ($0<v\leqq2$), or LiSiO) and a material having one or more phases of silicon compounds containing carbon and oxygen at least in part. In addition to silicon, carbon, and oxygen, at least one selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), boron (B), magnesium (Mg), molybdenum (Mo), calcium (Ca), nitrogen (N), niobium (Nb), tantalum (Ta), vanadium (V), tungsten (W), lithium (Li), and chromium (Cr) may be contained.

In the anode active material, the content of carbon is from 0.2 atomic % to 10 atomic % both inclusive, and the content of oxygen is from 0.5 atomic % to 40 atomic % both inclusive. In particular, it is desirable that the content of carbon is from 0.4 atomic % to 5 atomic % both inclusive, and the content of oxygen is from 3 atomic % to 25 atomic % both inclusive. Further, a ratio from 0.1% to 17.29% both inclusive of silicon contained in the anode active material exists as Si—C bond.

Examples of measurement methods for examining bonding state of carbon in the anode active material include X-ray Photoelectron Spectroscopy (XPS). In XPS, Si—C bond and Si—Si bond are identified, and a ratio existing as Si—C bond among silicon contained in the anode active material is obtained based on a ratio between peak intensity originated in Si—C bond and peak intensity originated in Si—Si bond. Specifically, for example, based on the intensity ratio between Si—C bond component of 1s orbit (C1s) peak of carbon bonded to silicon and 2p orbit (Si2p) peak of silicon, a ratio existing as Si—C bond among silicon contained in the anode active material is obtained. For a silicon carbide compound, only a compound having a composition ratio of Si:C=1:1 (SiC) exists. Thus, the amount of silicon (Si) having Si—C bond is equal to the amount of carbon (C) having Si—C bond.

The anode active material layer 102 may have a single layer structure or a multilayer structure. In the case of the multilayer structure, it is preferable that the anode active material layer 102 have a structure in which a plurality of first layers and a plurality of second layers having an oxygen content different from each other are alternately layered. Thereby, in the case of being used for an electrochemical device such as a secondary battery, such a structure is suitable for obtaining higher cycle characteristics. Further, in this case, in the manufacturing process, the anode active material layer 102 is formed in several steps, and thus adjustment of the oxygen content that is difficult to control in one time film forming such as adjustment of oxidation degrees for respective layers becomes easy. In addition, in the case where the oxygen content in the anode active material layer 102 is large, the stress of the anode active material formed on the anode current collector 101 tends to be large. In this case, by forming the anode active material layer 102 in several steps, the stress of the anode active material is relaxed, and thus an anode with a desired composition easily handled is able to be formed.

The anode active material layer 102 may contain one or more other anode materials capable of inserting and extracting an electrode reactant as an anode active material. Examples of other anode materials include a material that is capable of inserting and extracting the electrode reactant and contains at least one of metal elements and metalloid elements as an element. Such other anode material may be a simple substance, an alloy, or a compound of a metal element or a metalloid element, or a material having one or more phases thereof at least in part. In the invention, "the alloy" includes an alloy containing one or more metal elements and one or more metalloid elements, in addition to an alloy composed of two or more metal elements. Further, "the alloy" in the invention may contain a nonmetallic element. The texture thereof includes a solid solution, a eutectic crystal (eutectic mixture), an intermetallic compound, and a texture in which two or more thereof coexist.

Examples of metal elements or metalloid elements composing other anode material include a metal element and a metalloid element capable of forming an alloy with the electrode reactant. Specifically, examples thereof include magnesium (Mg), boron (B), aluminum (Al), gallium (Ga), indium (In), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), platinum (Pt) and the like.

As the foregoing other anode material, the simple substance of silicon or an alloy of silicon may be contained. As the alloy of silicon, for example, at least one selected from the group consisting of tin, nickel, copper, iron, cobalt, manganese, zinc, indium, silver, titanium, germanium, bismuth, antimony, and chromium may be contained as the second element other than silicon. Further, as the foregoing other anode material, a compound of silicon not containing carbon and oxygen may be contained. Examples of alloys or compounds of silicon include, $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $Si_3N_4$ and the like.

It is preferable that the anode active material layer 102 containing silicon, carbon, and oxygen as an anode material be formed by using vacuum evaporation method, and the anode active material layer 102 and the anode current collector 101 are alloyed in at least part of the interface thereof. Specifically, it is preferable that at the interface thereof, the element of the anode current collector 101 be diffused in the anode active material layer 102; or the element of the anode active material layer 102 be diffused in the anode current collector 101; or these elements be diffused in each other. Thereby, destruction due to expansion and shrinkage of the anode active material layer 102 associated with charge and discharge is prevented, and the electron conductivity between the anode active material layer 102 and the anode current collector 101 is improved. Examples of vacuum evaporation methods include electron beam evaporation method (electron beam heating evaporation method), resistance heating method and the like.

Subsequently, a description will be given of a method of manufacturing the anode. The anode is manufactured as follows. The anode current collector 101 is prepared, and surface roughening is provided for the surface thereof according to needs. After that, the anode active material layer 102 containing silicon, carbon, and oxygen is formed on the anode current collector 101 by vacuum evaporation method using the electron beam evaporation apparatus (hereinafter simply referred to as evaporation apparatus) illustrated in FIG. 2.

Figure 2:
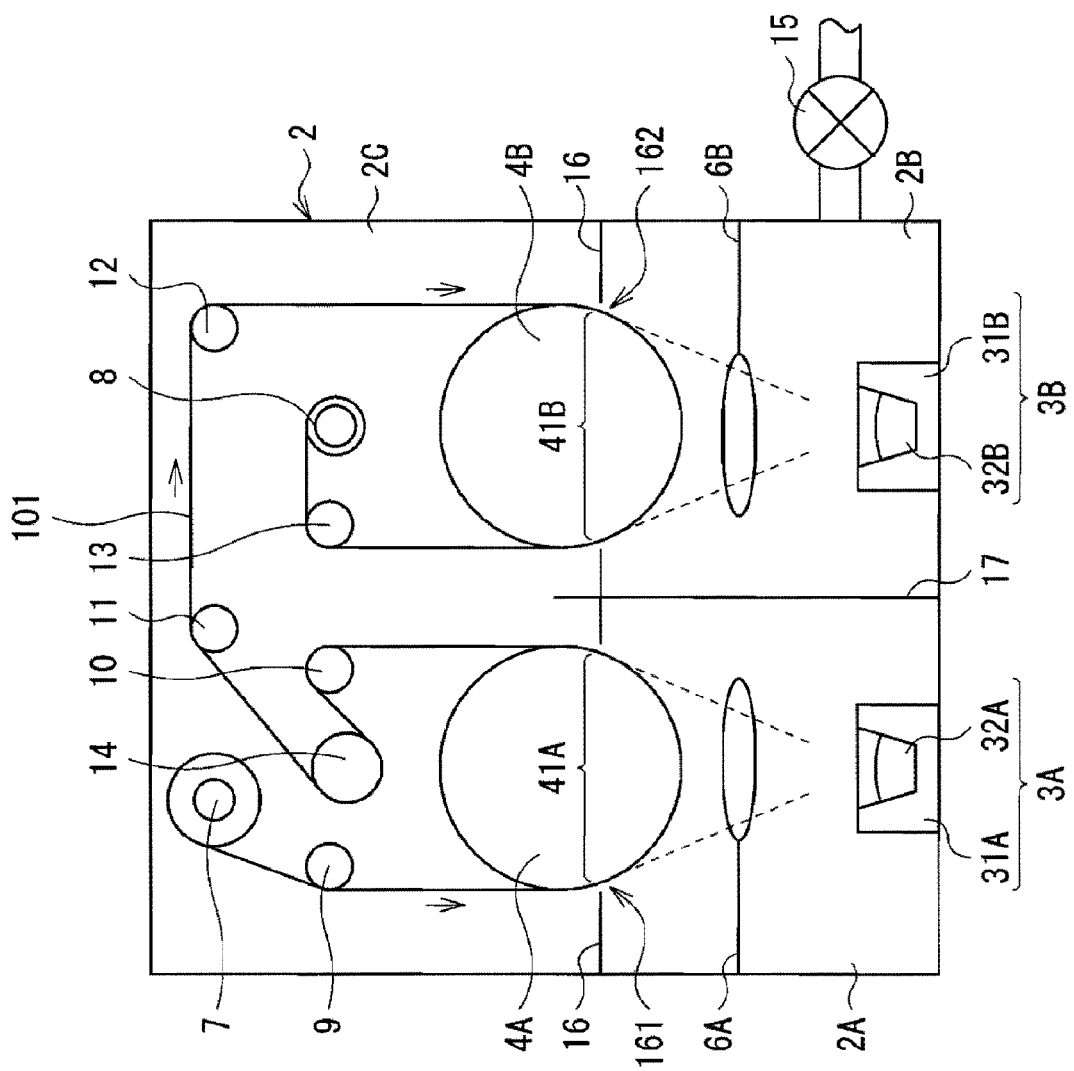
FIG. 2 a schematic view illustrating a configuration of an evaporation apparatus used for manufacturing the anode of an embodiment of the invention.

FIG. 2 is a schematic view illustrating a configuration of an evaporation apparatus suitable for manufacturing the anode of this embodiment. In the evaporation apparatus, evaporation materials 32A and 32B contained in crucibles 31A and 31B are vaporized and deposited on the surface of the anode current collector 101 as an evaporation object made of a strip-shaped metal foil or the like retained by can rolls 4A and 4B, and thereby the anode active material layer 102 is formed.

In the evaporation apparatus, evaporation sources 3A and 3B, the can rolls (deposition rolls) 4A and 4B, shutters 6A and 6B, wind-up rollers 7 and 8, guide rollers 9 to 13, and a feed roller 14 are included in an evaporation treatment bath 2. Outside the evaporation treatment bath 2, a vacuum air exhaust 15 is provided.

The evaporation treatment bath 2 is segmented into evaporation source installation chambers 2A and 2B and an evaporation object running chamber 2C by a division plate 16. The evaporation source installation chamber 2A and the evaporation source installation chamber 2B are separated by a division wall 17. In the evaporation source installation chamber 2A, the shutter 6A is installed in addition to the evaporation source 3A. In the other evaporation source installation chamber 2B, the shutter 6B is installed in addition to the evaporation source 3B. For the details of the evaporation sources 3A and 3B and the shutters 6A and 6B, a description will be given later. Further, the evaporation treatment bath 2 is provided with a gas inlet (not illustrated), which enables supplying oxygen gas.

In the evaporation object running chamber 2C, the can rolls 4A and 4B are respectively installed above the evaporation sources 3A and 3B. However, the division plate 16 is provided with openings 161 and 162 in two locations corresponding to the can rolls 4A and 4B, and part of the can rolls 4A and 4B is protruded into the evaporation source installation chambers 2A and 2B. Further, in the evaporation object running chamber 2C, as a means for retaining and running the anode current collector 101 in the longitudinal direction, the wind-up rollers 7 and 8, the guide rollers 9 to 13, and the feed roller 14 are respectively arranged in predetermined positions.

The anode current collector 101 is, for example, in a state that its one end side is wound up by the wind-up roller 7, and the other end side is attached to the wind-up roller 8 through the guide roller 9, the can roll 4A, the guide roller 10, the feed roller 14, the guide roller 11, the guide roller 12, the can roll 14B, and the guide roller 13 in this order from the wind-up roller 7. The anode current collector 101 is arranged to be contacted with each outer circumferential plane of the wind-up rollers 7 and 8, the guide rollers 9 to 13, and the feed roller 14. One face (front face) of the anode current collector 101 is contacted with the can roll 4A, and the other face (rear face) is contacted with the can roll 4B. The wind-up rollers 7 and 8 are drive-system. Thus, the anode current collector 101 is able to be sequentially conveyed from the wind-up roller 7 to the wind-up roller 8, and is able to be sequentially conveyed from the wind-up roller 8 to the wind-up roller 7 as well. FIG. 2 illustrates a state that the anode current collector 101 runs from the wind-up roller 7 to the wind-up roller 8, and arrows in the figure indicate the direction in which the anode current collector 101 is moved. Further, in the evaporation apparatus, the feed roller 14 is also a drive-system.

The can rolls 4A and 4B are a rotating body (drum) in the shape of, for example, a cylinder for retaining an evaporation object 1. The can rolls 4A and 4B rotate (rotate on its axis) and thereby part of the outer circumferential plane sequentially enters the evaporation source installation chambers 2A and 2B to oppose the evaporation sources 3A and 3B. Out of the outer circumferential plane of the can rolls 4A and 4B, portions 41A and 41B entering the evaporation source installation chambers 2A and 2B become evaporation regions where the thin film is formed from the evaporation materials 32A and 32B from the evaporation sources 3A and 3B.

In the evaporation sources 3A and 3B, the evaporation materials 32A and 32B containing single crystal silicon and carbon are contained in the crucibles 31A and 31B composed of, for example, boron nitride (BN). The evaporation materials 32A and 32B are heated and thereby vaporized (volatilized). Specifically, the evaporation sources 3A and 3B further include, for example, an electron gun (not illustrated). A thermal electron emitted by driving the electron gun is irradiated to the evaporation materials 32A and 32B contained in the crucibles 31A and 31B, while the range thereof is electromagnetically controlled by, for example, a deflection yoke (not illustrated). The evaporation materials 32A and 32B are heated by radiation of the thermal electron from the electron gun, melted, and then gradually vaporized.

The crucibles 31A and 31B are composed of, for example, an oxide such as titanium oxide, tantalum oxide, zirconium oxide, and silicon oxide in addition to boron nitride. To prevent temperatures of the crucibles 31A and 31B from being excessively increased due to irradiation of the thermal electron to the evaporation materials 32A and 32B, part of the surroundings of the crucibles 31A and 31B (for example, the bottom face) may be contacted with a cooling system (not illustrated). As the cooling system, for example, a water-cooling chiller such as a water jacket is suitable.

The shutters 6A and 6B are an openable and closable mechanism that is arranged between the evaporation sources 3A and 3B and the can rolls 4A and 4B, and controls passing of the vapor-phase evaporation materials 32A and 32B from the crucibles 31A and 31B to the anode current collector 101 retained by the can rolls 4A and 4B. That is, in the evaporation treatment, the shutters 6A and 6B are opened to allow the vapor-phase evaporation materials 32A and 32B vaporized from the crucibles 31A and 31B to pass. Meanwhile, before and after the evaporation treatment, the shutters 6A and 6B block passing of the vapor-phase evaporation materials 32A and 32B. The shutters 6A and 6B are connected to a control circuit system (not illustrated). In the case where a command signal to open or close the shutters 6A and 6B is inputted, the shutters 6A and 6B are driven.

The anode of this embodiment is manufactured by using the evaporation apparatus as follows. Specifically, first, the anode current collector 101 as a roll is attached to the wind-up roller 7, and the end on the outer circumferential side is pulled out. The end is attached to a fit portion (not illustrated) of the wind-up roller 8 through the guide roller 9, the can roll 4A, the guide roller 10, the feed roller 14, the guide roller 11, the guide roller 12, the can roll 4B, and the guide roller 13 sequentially.

Next, air is exhausted by the vacuum air exhaust 15, so that the vacuum degree in the evaporation treatment bath 2 becomes a given value (for example, about $10^{-3}$ Pa). At this point, the shutters 6A and 6B are closed. While the shutters 6A and 6B are kept closed, the evaporation materials 32A and 32B contained in the crucibles 31A and 31B are heated, and vaporized (volatilized). In this state, observation of the vaporization rate of the evaporation materials 32A and 32B contained in the crucibles 31A and 31B is started by using a quartz monitor (not illustrated) or the like. At the instant when a given time lapses from vaporization start, determination is made whether or not the vaporization rate reaches the target value and whether or not the vaporization rate becomes stable. If it is confirmed that the vaporization rate reaches the target value and becomes stable, while a certain amount of oxygen gas is introduced into the evaporation treatment bath 2, the wind-up roller 8 and the like are driven to start running of the anode current collector 101 and to open the shutters 6A and 6B. Thereby, the volatilized evaporation materials 32A and 32B pass through the opened shutters 6A and 6B and reach the anode current collector 101 retained by the can rolls 4A and 4B. Then, evaporation to both faces of the anode current collector 101 is started. As a result, by adjusting the running speed of the anode current collector 101 and the evaporation rate of the evaporation materials 32A and 32B, the anode active material layer 102 having a given thickness is able to be formed.

The description has been given of the case that the anode active material layer 102 is formed on the anode current collector 101 while the anode current collector 101 runs from the wind-up roller 7 to the wind-up roller 8 (for convenience, referred to as forward running). However, it is possible that the anode active material layer 102 is formed while the anode current collector 101 runs in the reverse direction, that is, runs from the wind-up roller 8 to the wind-up roller 7. In this case, the wind-up rollers 7 and 8, the guide rollers 9 to 13, the feed roller 14, and the can rolls 4A and 4B are rotated in the reverse direction. The anode active material layer 102 may be formed at a time by single running of the anode current collector 101. However, to form the anode active material layer 102 having a multilayer structure, evaporation should be performed by a plurality of times of running. At this time, the anode active material layer 102 having a multilayer structure in which the plurality of first layers and the plurality of second layers having an oxygen content different from each other are alternately layered is able to be formed by adjusting the introduction amount of oxygen gas to the evaporation treatment bath 2.

According to the anode of this embodiment, a certain amount of carbon and a certain amount of oxygen are added to the anode active material layer 102 containing silicon provided on the anode current collector 101, and a ratio from 0.1% to 17.29% both inclusive of silicon contained in the anode active material exists as Si—C bond. Thus, the contact force of the anode active material layer 102 to the anode current collector 101 is able to be improved. Further, the anode active material layer 102 itself becomes physically rigid. Therefore, in the case where the anode is used for an electrochemical device such as a secondary battery, the electric resistance between the anode current collector 101 and the anode active material layer 102 is lowered and lithium is effectively inserted and extracted in charge and discharge, collapse of the anode active material layer 102 associated with charge and discharge is prevented, and thus superior cycle characteristics are obtainable. In particular, since the anode active material layer 102 contains silicon, it is advantageous to realize a high capacity as well.

Next, a description will be hereinafter given of a usage example of the foregoing anode. As an example of the electrochemical devices, secondary batteries are herein taken. The anode is used as follows.

First Secondary Battery

Figure 3:
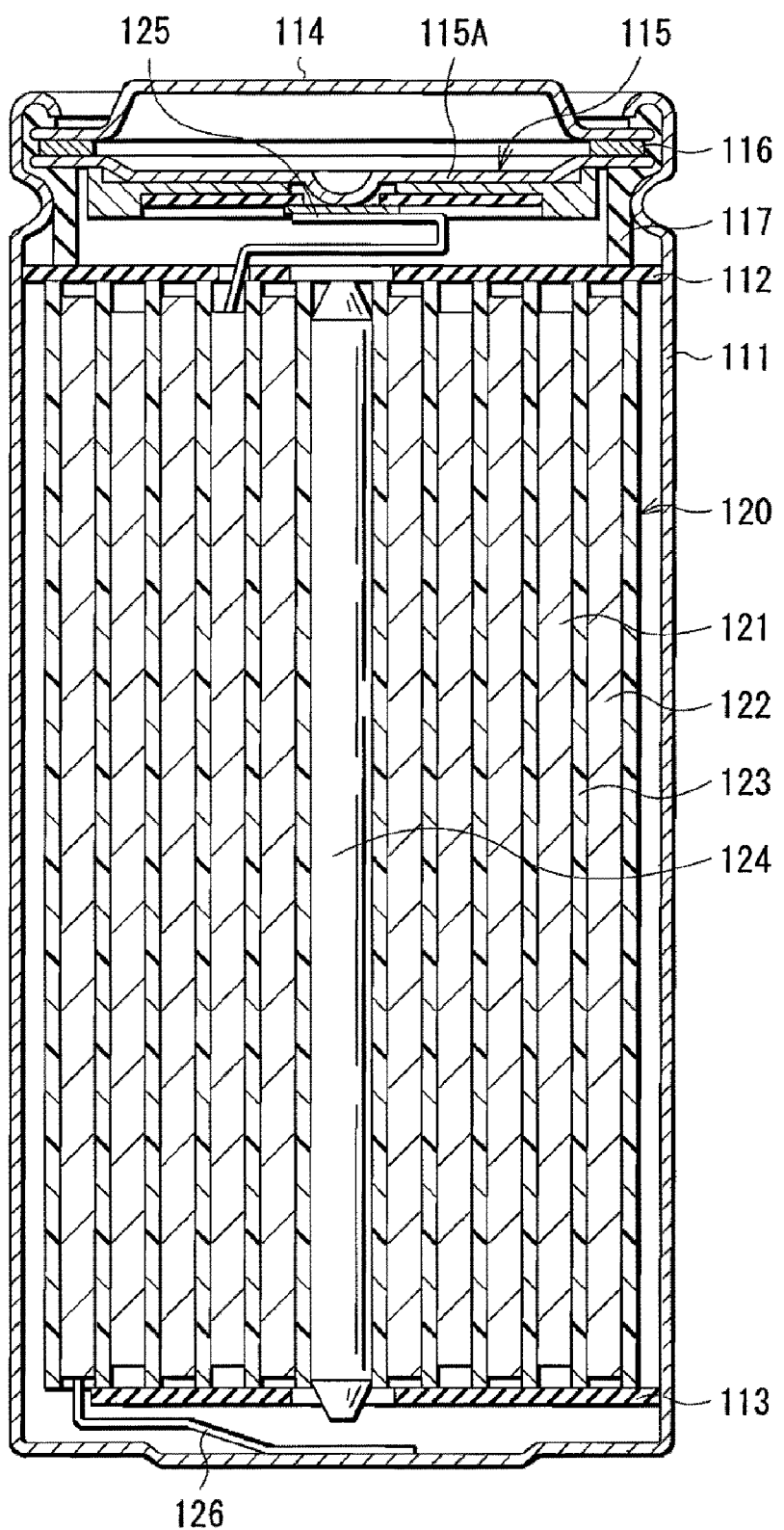
FIG. 3 is a cross sectional view illustrating a structure of a first battery using the anode according to the embodiment of the invention.
Figure 4:
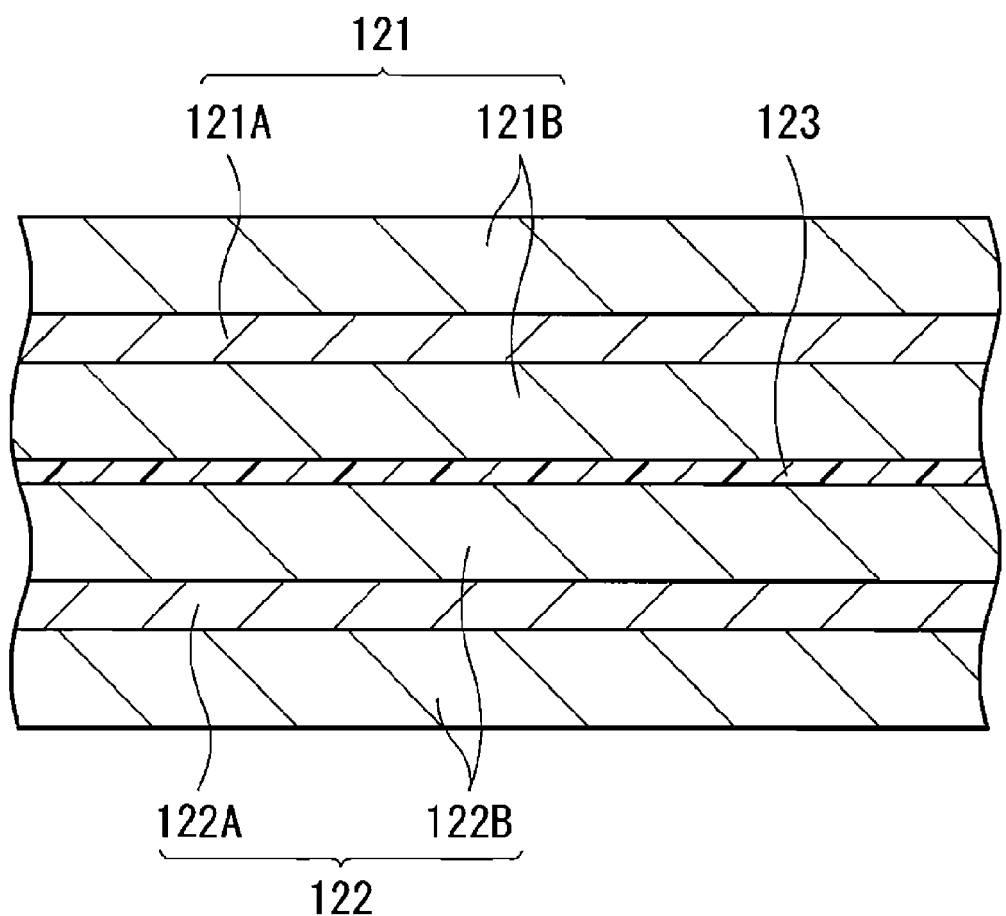
FIG. 4 is a cross sectional view illustrating an enlarged part of the spirally wound electrode body illustrated in FIG. 3.

FIG. 3 and FIG. 4 illustrate a cross sectional structure of a first secondary battery. FIG. 4 illustrates an enlarged part of a spirally wound electrode body 120 illustrated in FIG. 3. The secondary battery herein described is, for example, a lithium ion secondary battery in which the capacity of an anode 122 is expressed based on insertion and extraction of lithium.

In the secondary battery, the spirally wound electrode body 120 in which a cathode 121 and the anode 122 are layered with a separator 123 in between and spirally wound and a pair of insulating plates 112 and 113 are mainly contained in a battery can 111 in the shape of an approximately hollow cylinder. The battery structure including the battery can 111 is called cylindrical type.

The battery can 111 is made of, for example, a metal material such as iron, aluminum, an alloy thereof and the like. One end of the battery can 111 is closed, and the other end thereof is opened. The pair of insulating plates 112 and 113 is arranged perpendicular to the spirally wound periphery face, so that the spirally wound electrode body 120 is sandwiched between the insulating plates 112 and 113.

At the open end of the battery can 111, a battery cover 114, and a safety valve mechanism 115 and a Positive Temperature Coefficient (PTC) device 116 provided inside the battery cover 114 are attached by being caulked with a gasket 117. Inside of the battery can 111 is thereby hermetically closed. The battery cover 114 is, for example, made of a material similar to that of the battery can 111. The safety valve mechanism 115 is electrically connected to the battery cover 114 through the PTC device 116. In the safety valve mechanism 115, when the internal pressure of the battery becomes a certain level or more due to internal short circuit, external heating or the like, a disk plate 115A flips to cut the electrical connection between the battery cover 114 and the spirally wound electrode body 120. The PTC device 116 limits a current by increasing the resistance according to increased temperature to prevent abnormal heat generation resulting from a large current. The gasket 117 is made of, for example, an insulating material, and its surface is coated with asphalt.

A center pin 124 may be inserted in the center of the spirally wound electrode body 120. In the spirally wound electrode body 120, a cathode lead 125 made of a metal material such as aluminum is connected to the cathode 121, and an anode lead 126 made of a metal material such as nickel is connected to the anode 122. The cathode lead 125 is electrically connected to the battery cover 114 by being welded to the safety valve mechanism 115. The anode lead 126 is welded and electrically connected to the battery can 111.

The cathode 121 has a structure in which, for example, a cathode active material layer 121B is provided on both faces of a cathode current collector 121A having a pair of faces. The cathode current collector 21A is made of, for example, a metal material such as aluminum, nickel, and stainless. The cathode active material layer 121B contains a cathode active material, and may contain other material such as a binder and an electrical conductor according to needs.

The cathode active material contains one or more cathode materials capable of inserting and extracting lithium as an electrode reactant. As the cathode material, for example, a lithium-containing compound is preferable, since thereby a high energy density is obtained. Examples of lithium-containing compounds include a complex oxide containing lithium and a transition metal element and a phosphate compound containing lithium and a transition metal element. In particular, a compound containing at least one selected from the group consisting of cobalt, nickel, manganese, and iron as a transition metal element is preferable, since thereby a higher voltage is obtained. The chemical formula thereof is expressed by, for example, $Li_xM1O_2$ or $Li_yM2PO_4$. In the formula, M1 and M2 represent one or more transition metal elements. Values of x and y vary according to charge and discharge states of the secondary battery, and are generally in the range of $0.05 \leq x \leq 1.10$ and $0.05 \leq y \leq 1.10$.

Examples of complex oxides containing lithium and a transition metal element include a lithium-cobalt complex oxide ($Li_xCoO_2$), a lithium-nickel complex oxide ($Li_xNiO_2$), a lithium-nickel-cobalt complex oxide ($Li_xNi_{(1-z)}Co_zO_2$ (z<1)), a lithium-nickel-cobalt-manganese complex oxide ($Li_xNi_{(1-v-w)}Co_vMn_wO_2$ (v+w<1)), lithium-manganese complex oxide having a spinel type structure ($LiMn_2O_4$) and the like. Specially, the complex oxide containing cobalt is preferable, since thereby a high capacity is obtained and superior cycle characteristics are obtained. Examples of phosphate compounds containing lithium and a transition metal element include lithium-iron phosphate compound ($LiFePO_4$), a lithium-iron-manganese phosphate compound ($LiFe_{(1-u)}Mn_uPO_4$ (u<1)) and the like.

In addition, examples of cathode materials include an oxide such as titanium oxide, vanadium oxide, and manganese dioxide; a disulfide such as titanium disulfide and molybdenum disulfide; a chalcogenide such as niobium selenide; sulfur; and a conductive polymer such as polyaniline and polythiophene.

The anode 122 has a structure similar to that of the foregoing anode. The anode 122 has, for example, a structure in which an anode active material layer 122B is provided on both faces of an anode current collector 122A having a pair of faces. Structures of the anode current collector 122A and the anode active material layer 122B are respectively similar to the structures of the anode current collector 101 and the anode active material layer 102 in the foregoing anode. In the anode 122, the charge capacity of the anode material capable of inserting and extracting lithium is preferably larger than the charge capacity of the cathode 121, since thereby even in a full-charged state, a possibility that lithium is precipitated as dendrite onto the anode 122 becomes low.

The separator 123 separates the cathode 121 from the anode 122, prevents current short circuit due to contact of both electrodes, and passes lithium ions. The separator 123 is made of, for example, a porous film made of a synthetic resin such as polytetrafluoroethylene, polypropylene, and polyethylene, or a ceramic porous film. The separator 23 may have a structure in which two or more of the foregoing porous films are layered. Specially, the porous film made of polyolefin is preferable, since such a film has a superior short circuit preventive effect and is able to improve safety of the secondary battery by shutdown effect. In particular, polyethylene is preferable, since polyethylene provides shutdown effect at from 100 deg C. to 160 deg C. both inclusive and has superior electrochemical stability. Further, polypropylene is also preferable. In addition, as long as chemical stability is secured, a resin formed by copolymerizing or blending with polyethylene or polypropylene may be used.

An electrolytic solution as a liquid electrolyte is impregnated in the separator 123. The electrolytic solution contains a solvent and an electrolyte salt dissolved in the solvent.

The solvent contains, for example, one or more nonaqueous solvents such as an organic solvent. Examples of nonaqueous solvents include, for example, ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, trimethyl methyl acetate, trimethyl ethyl acetate, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, dimethyl sulfoxide and the like. Specially, the solvent preferably contains at least one selected from the group consisting of ethylene carbonate, propylene carbonate, dimethyl carbonate, diethyl carbonate, and ethyl methyl carbonate. Thereby, superior capacity characteristics, superior cycle characteristics, and superior storage characteristics are obtained. In this case, in particular, a mixture of a high viscosity (high dielectric constant) solvent (for example, specific inductive $\in \geq 30$) such as ethylene carbonate and propylene carbonate and a low viscosity solvent (for example, viscosity $\leq 1$ mPa·s) such as dimethyl carbonate, ethyl methyl carbonate, and diethyl carbonate is more preferable. Thereby, the dissociation property of the electrolyte salt and the ion mobility are improved, and thus higher effects are able to be obtained.

The solvent preferably contains a cyclic ester carbonate having an unsaturated bond represented by Chemical formula 1 to Chemical formula 3. Thereby, high cycle characteristics are obtained. One thereof may be used singly, or a plurality thereof may be used by mixture.

Chemical formula 1

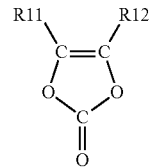

In the formula, R11 and R12 are a hydrogen group or an alkyl group.

Chemical formula 2

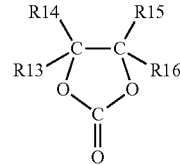

In the formula, R13 to R16 are a hydrogen group, an alkyl group, a vinyl group, or an aryl group. At least one of R13 to R16 is the vinyl group or the aryl group.

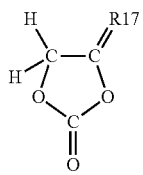

Chemical formula 3

In the formula, R17 is an alkylene group.

The cyclic ester carbonate having an unsaturated bond represented by Chemical formula 1 is a vinylene carbonate compound. Examples of vinylene carbonate compounds include vinylene carbonate (1,3-dioxole-2-one), methylvinylene carbonate (4-methyl-1,3-dioxole-2-one), ethylvinylene carbonate (4-ethyl-1,3-dioxole-2-one), 4,5-dimethyl-1,3-dioxole-2-one, 4,5-diethyl-1,3-dioxole-2-one, 4-fluoro-1,3-dioxole-2-one, 4-trifluoromethyl-1,3-dioxole-2-one and the like. Specially, vinylene carbonate is preferable, since vinylene carbonate is easily available and provides high effect.

The cyclic ester carbonate having an unsaturated bond represented by Chemical formula 2 is a vinylethylene carbonate compound. Examples of vinylethylene carbonate compounds include vinylethylene carbonate (4-vinyl-1,3-dioxolane-2-one), 4-methyl-4-vinyl-1,3-dioxolane-2-one, 4-ethyl-4-vinyl-1,3-dioxolane-2-one, 4-n-propyl-4-vinyl-1,3-dioxolane-2-one, 5-methyl-4-vinyl-1,3-dioxolane-2-one, 4,4-divinyl-1,3-dioxolane-2-one, 4,5-divinyl-1,3-dioxolane-2-one and the like. Specially, vinylethylene carbonate is preferable, since vinylethylene carbonate is easily available, and provides high effect. It is needless to say that all of R13 to R16 may be the vinyl group or the aryl group. Otherwise, it is possible that some of R13 to R16 are the vinyl group, and the others thereof are the aryl group.

The cyclic ester carbonate having an unsaturated bond represented by Chemical formula 3 is a methylene ethylene carbonate compound. Examples of methylene ethylene carbonate compounds include 4-methylene-1,3-dioxolane-2-one, 4,4-dimethyl-5-methylene-1,3-dioxolane-2-one, 4,4-diethyl-5-methylene-1,3-dioxolane-2-one and the like. The methylene ethylene carbonate compound may have one methylene group (compound represented by Chemical formula 3), or have two methylene groups.

The cyclic ester carbonate having an unsaturated bond may be catechol carbonate having a benzene ring or the like, in addition to the compounds represented by Chemical formula 1 to Chemical formula 3. The content of the foregoing cyclic ester carbonate having an unsaturated bond in the solvent is preferably 0.01 wt % to 10 wt % both inclusive, since thereby sufficient effects are obtained.

The solvent preferably contains at least one of a chain ester carbonate having halogen as an element represented by Chemical formula 4 and a cyclic ester carbonate having halogen as an element represented by Chemical formula 5. Thereby, a stable protective film is formed on the surface of the anode 22 and decomposition reaction of the electrolytic solution is prevented, and thus the cycle characteristics are improved.

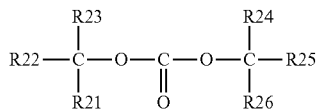

Chemical formula 4

In the formula, R21 to R26 are a hydrogen group, a halogen group, an alkyl group, or an alkyl halide group. At least one of R21 to R26 is the halogen group or the alkyl halide group.

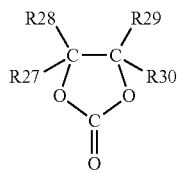

Chemical formula 5

In the formula, R27 to R30 are a hydrogen group, a halogen group, an alkyl group, or an alkyl halide group. At least one of R27 to R30 is the halogen group or the alkyl halide group.

R21 to R26 in Chemical formula 4 may be identical or different. The same is applied to R27 to R30 in Chemical formula 5. Though the halogen type is not particularly limited, examples thereof include at least one selected from the group consisting of fluorine, chlorine, and bromine, and fluorine is specially preferable since thereby higher effect is obtained. It is needless to say that other halogen may be applicable.

The number of halogen is more preferably two than one, and further may be three or more, since thereby an ability to form a protective film is improved, and a more rigid and more stable protective film is formed. Accordingly, decomposition reaction of the electrolytic solution is further prevented.

Examples of chain ester carbonates having halogen represented by Chemical formula 4 include fluoromethyl methyl carbonate, bis(fluoromethyl) carbonate, difluoromethyl methyl carbonate and the like. One thereof may be used singly, or a plurality thereof may be used by mixture.

Examples of cyclic ester carbonates having halogen represented by Chemical formula 5 include compounds represented by Chemical formulas 6(1) to 7(9). That is, examples thereof include 4-fluoro-1,3-dioxolane-2-one of Chemical formula 6(1), 4-chloro-1,3-dioxolane-2-one of Chemical formula 6(2), 4,5-difluoro-1,3-dioxolane-2-one of Chemical formula 6(3), tetrafluoro-1,3-dioxolane-2-one of Chemical formula 6(4), 4-fluoro-5-chloro-1,3-dioxolane-2-one of Chemical formula 6(5), 4,5-dichloro-1,3-dioxolane-2-one of Chemical formula 6(6), tetrachloro-1,3-dioxolane 2-one of Chemical formula 6(7), 4,5-bistrifluoromethyl-1,3-dioxolane-2-one of Chemical formula 6(8), 4-trifuloromethyl-1,3-dioxolane-2-one of Chemical formula 6(9), 4,5-difluoro-4,5-dimethyl-1,3-dioxolane-2-one of Chemical formula 6(10), 4-methyl-5,5-difluoro-1,3-dioxolane-2-one of Chemical formula 3(11), 4-ethyl-5,5-difluoro-1,3-dioxolane-2-one of Chemical formula 3(12) and the like. Further, examples thereof include 4-trifluoromethyl-5-fluoro-1,3-dioxolane-2-one of Chemical formula 7(1), 4-trifluoromethyl-5-methyl-1,3-dioxolane-2-one of Chemical formula 7(2), 4-fluoro-4,5-dimethyl-1,3-dioxolane-2-one of Chemical formula 7(3), 4,4-difluoro-5-(1,1-difluoroethyl)-1,3-dioxolane-2-one of Chemical formula 7(4), 4,5-dichloro-4,5-dimethyl-1,3-dioxolane-2-one of Chemical formula 7(5), 4-ethyl-5-fluoro-1,3-dioxolane-2-one of Chemical formula 7(6), 4-ethyl-4,5-difluoro-1,3-dioxolane-2-one of Chemical formula 7(7), 4-ethyl-4,5,5-trifluoro-1,3-dioxolane-2-one of Chemical formula 7(8), 4-fluoro-4-methyl-1,3-dioxolane-2-one of Chemical formula 7(9) and the like. One thereof may be used singly, or a plurality thereof may be used by mixture.
Chemical formula 6
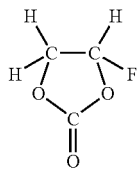  (1)
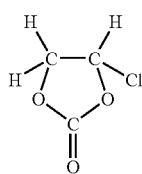  (2)
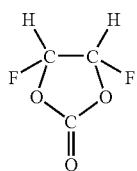  (3)
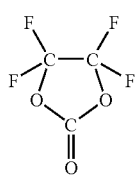  (4)
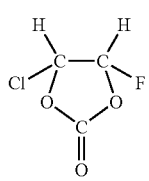  (5)
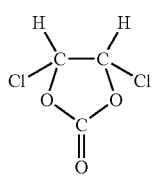  (6)
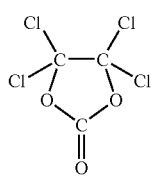  (7)
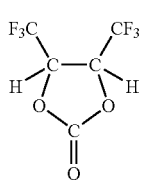  (8)
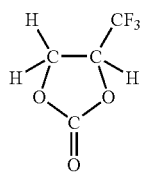  (9)
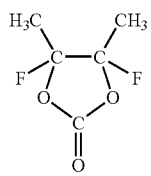  (10)
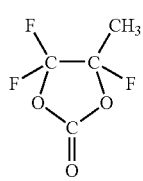  (11)
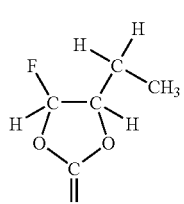  (12)
Chemical formula 7
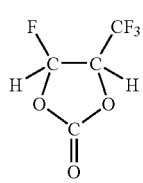  (1)
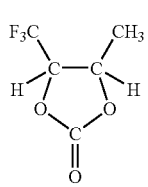  (2)
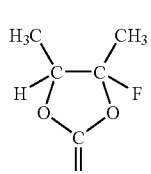  (3)
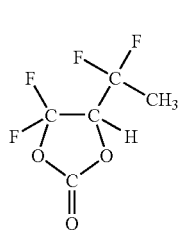  (4)

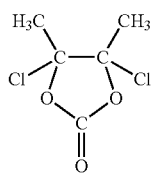
(5)

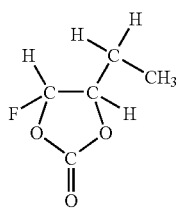
(6)

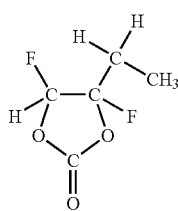
(7)

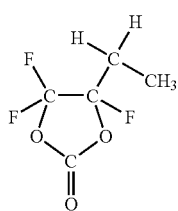
(8)

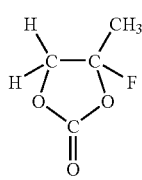
(9)

Specially, 4-fluoro-1,3-dioxolane-2-one or 4,5-difluoro-1,3-dioxolane-2-one is preferable, and 4,5-difluoro-1,3-dioxolane-2-one is more preferable. In particular, as 4,5-difluoro-1,3-dioxolane-2-one, a trans isomer is preferable to a cis isomer, since the trans isomer is easily available and provides high effect.

The electrolyte salt contains, for example, one or more light metal salts such as a lithium salt. Examples of lithium salts include lithium hexafluorophosphate, lithium tetrafluoroborate, lithium perchlorate, lithium hexafluoroarsenate and the like, since thereby superior capacity characteristics, superior cycle characteristics, and superior storage characteristics are obtained. Specially, lithium hexafluorophosphate is preferable, since the internal resistance is lowered, and thus higher effect is obtained.

The electrolyte salt preferably contains at least one selected from the group consisting of the compounds represented by Chemical formula 8 to Chemical formula 10. Thereby, in the case where such a compound is used together with the foregoing lithium hexafluorophosphate or the like, higher effect is obtained. R33 in Chemical formula 8 may be identical or different. The same is applied to R41 to R43 in Chemical formula 9 and R51 and R52 in Chemical formula 10.

Chemical formula 8

$$\left[\left(Y31\underset{O}{\overset{O}{\diagdown}}M31\text{-}R31_{b3}\right)_{a3}\right]_{c3}^{m3-} X31_{d3}^{n3+}$$

In the formula, X31 is a Group 1 element or a Group 2 element in the long period periodic table or aluminum. M31 is a transition metal element, a Group 13 element, a Group 14 element, or a Group 15 element in the long period periodic table. R31 is a halogen group. Y31 is —OC—R32-CO—, —OC—C(R33)$_2$—, or —OC—CO—. R32 is an alkylene group, an alkylene halide group, an arylene group, or an arylene halide group. R33 is an alkyl group, an alkyl halide group, an aryl group, or an aryl halide group. a3 is one of integer numbers 1 to 4. b3 is 0, 2, or 4. c3, d3, m3, and n3 are one of integer numbers 1 to 3.

Chemical formula 9

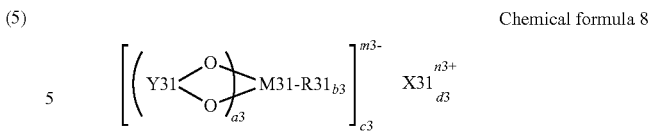

In the formula, X41 is a Group 1 element or a Group 2 element in the long period periodic table. M41 is a transition metal element, a Group 13 element, a Group element, or a Group 15 element in the long period periodic table. Y41 is —OC—(C(R41)$_2$)$_{b4}$-CO—, —(R43)$_2$C—(C(R42)$_2$)$_{c4}$-CO—, —(R43)$_2$C—(C(R42)$_2$)$_{c4}$-C(R43)$_2$—, —(R43)$_2$C—(C(R42)$_2$)$_{c4}$-SO$_2$—, —O$_2$S—(C(R42)$_2$)$_{d4}$-SO$_2$—, or —OC—(C(R42)$_2$)$_{d4}$-SO$_2$—. R41 and R43 are a hydrogen group, an alkyl group, a halogen group, or an alkyl halide group. At least one of R41 and R43 is respectively the halogen group or the alkyl halide group. R42 is a hydrogen group, an alkyl group, a halogen group, or an alkyl halide group. a4, e4, and n4 are an integer number of 1 or 2. b4 and d4 are one of integer numbers 1 to 4. c4 is one of integer numbers 0 to 4. f4 and m4 are one of integer numbers 1 to 3.

Chemical formula 10

$$\left[\underset{F_{b5}}{\overset{Rf_{c5}}{\diagdown}}M51\underset{O}{\overset{O}{\diagdown}}Y51\right)_{a5}\right]_{f5}^{m5-} X51_{g5}^{n5+}$$

In the formula, X51 is a Group 1 element or a Group 2 element in the long period periodic table. M51 is a transition metal element, a Group 13 element, a Group element, or a Group 15 element in the long period periodic table. Rf is a fluorinated alkyl group with the carbon number from 1 to 10 both inclusive or a fluorinated aryl group with the carbon number from 1 to 10 both inclusive. Y51 is —OC—(C (R51)$_2$)$_{d5}$-CO—, —(R52)$_2$C—(C(R51)$_2$)$_{d5}$-CO—, —(R52)$_2$C—(C(R51)$_2$)$_{d5}$-C(R52)$_2$—, —(R52)$_2$C—(C(R51)$_2$)$_{d5}$-SO$_2$—, —O$_2$S—(C(R51)$_2$)$_{e5}$-SO$_2$—, or —OC—(C(R51)$_2$)$_{e5}$-SO$_2$—. R51 is a hydrogen group, an alkyl group, a halogen group, or an alkyl halide group. R52 is a hydrogen group, an alkyl group, a halogen group, or an alkyl halide group, and at least one thereof is the halogen group or the alkyl halide group. a5, f5, and n5 are 1 or 2. b5, c5, and e5 are one of integer numbers 1 to 4. d5 is one of integer numbers 0 to 4. g5 and m5 are one of integer numbers 1 to 3.

Group 1 element in the long period periodic table represents hydrogen, lithium, sodium, potassium, rubidium, cesium, and francium. Group 2 element represents beryllium, magnesium, calcium, strontium, barium, and radium. Group 13 element represents boron, aluminum, gallium, indium, and thallium. Group 14 element represents carbon, silicon, germanium, tin, and lead. Group 15 element represents nitrogen, phosphorus, arsenic, antimony, and bismuth.

Examples of compounds represented by Chemical formula 8 include the compounds represented by Chemical formulas 11(1) to 11(6) and the like. Examples of compounds represented by Chemical formula 9 include the compounds represented by Chemical formulas 12(1) to 12(8) and the like. Examples of compounds represented by Chemical formula 10 include the compound represented by Chemical formula 13 and the like. It is needless to say that the compound is not limited to the compounds represented by Chemical formula 11(1) to Chemical formula 13 as long as the compound has a structure represented by Chemical formula 8 to Chemical formula 10.

Chemical formula 11

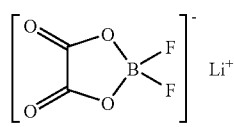
(1)

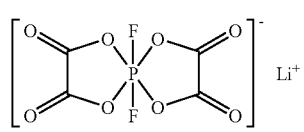
(2)

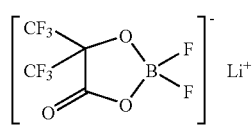
(3)

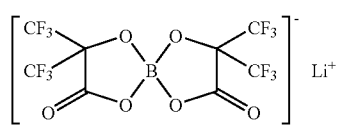
(4)

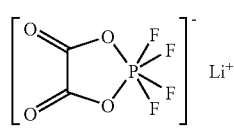
(5)

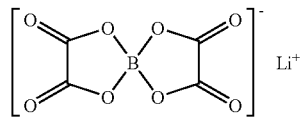
(6)

Chemical formula 12

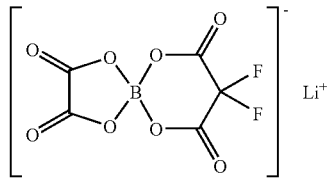
(1)

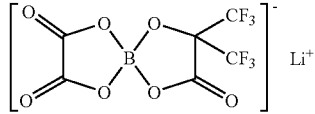
(2)

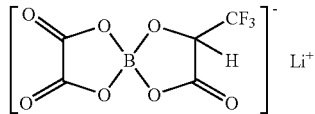
(3)

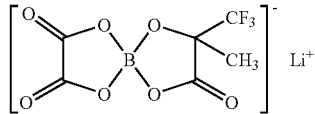
(4)

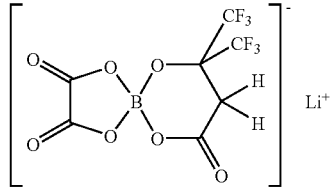
(5)

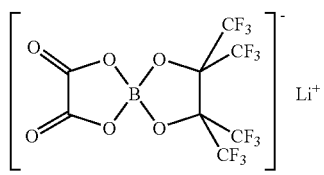
(6)

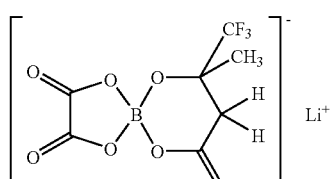
(7)

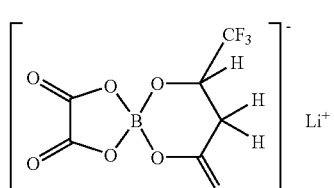
(8)

Chemical formula 13

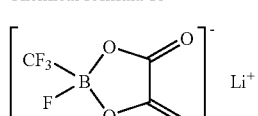

Further, the electrolyte salt preferably contain at least one selected from the group consisting of the compounds represented by Chemical formula 14 to Chemical formula 16. Thereby, in the case where such a compound is used together with the foregoing lithium hexafluorophosphate or the like, higher effect is obtained. m and n in Chemical formula 14 may be identical or different. The same is applied to p, q, and r in Chemical formula 16.

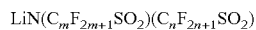
Chemical formula 14

In the formula, m and n are an integer number of 1 or more.

Chemical formula 15

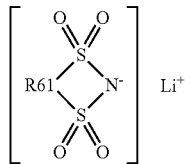

In the formula, R61 is a straight chain or branched perfluoro alkylene group with the carbon number from 2 to 4 both inclusive.

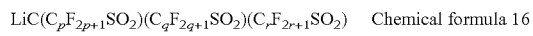
Chemical formula 16

In the formula, p, q, and r are an integer number of 1 or more.

Examples of chain compounds represented by Chemical formula 14 include lithium bis(trifluoromethanesulfonyl)imide (LiN(CF$_3$SO$_2$)$_2$), lithium bis(pentafluoroethanesulfonyl)imide (LiN(C$_2$F$_5$SO$_2$)$_2$), lithium (trifluoromethanesulfonyl)(pentafluoroethanesulfonyl)imide (LiN(CF$_3$SO$_2$)(C$_2$F$_5$SO$_2$)), lithium(trifluoromethanesulfonyl)(heptafluoropropanesulfonyl)imide (LiN(CF$_3$SO$_2$)(C$_3$F$_7$SO$_2$)), lithium(trifluoromethanesulfonyl)(nonafluorobutanesulfonyl)imide (LiN(CF$_3$SO$_2$)(C$_4$F$_9$SO$_2$)) and the like. One thereof may be used singly, or a plurality thereof may be used by mixture.

Examples of cyclic compounds represented by Chemical formula 15 include the compounds represented by Chemical formulas 17(1) to 17(4). That is, examples thereof include lithium 1,2-perfluoroethanedisulfonylimide represented by Chemical formula 17(1), lithium 1,3-perfluoropropanedisulfonylimide represented by Chemical formula 17(2), lithium 1,3-perfluorobutanedisulfonylimide represented by Chemical formula 17(3), lithium 1,4-perfluorobutanedisulfonylimide represented by Chemical formula 17(4) and the like. One thereof may be used singly, or a plurality thereof may be used by mixture. Specially, lithium 1,3-perfluoroethanedisulfonylimide is preferable, since thereby high effect is obtained.

Chemical formula 17

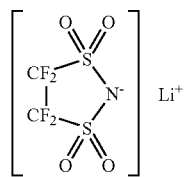
(1)

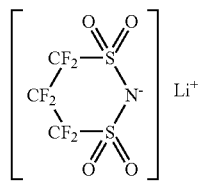
(2)

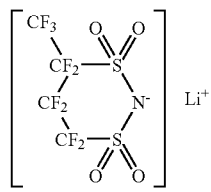
(3)

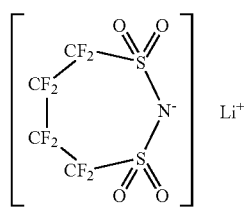
(4)

Examples of chain compounds represented by Chemical formula 16 include lithium tris(trifluoromethanesulfonyl)methyde (LiC(CF$_3$SO$_2$)$_3$) and the like.

The content of the electrolyte salt to the solvent is preferably from 0.3 mol/kg to 3.0 mol/kg both inclusive. If the content is out of the foregoing range, there is a possibility that the ion conductivity is significantly lowered.

The electrolytic solution may contain various additives together with the solvent and the electrolyte salt. Thereby, the chemical stability of the electrolytic solution is further improved.

Examples of additives include sultone (cyclic ester sulfonate). The sultone represents, for example, propane sultone, propene sultone or the like, and propane sultone is specially preferable. One thereof may be used singly, or a plurality thereof may be used by mixture.

Further, examples of additives include an acid anhydride. The acid anhydride represents, for example, carboxylic anhydride such as succinic anhydride, glutaric anhydride, and maleic anhydride; disulfonic anhydride such as ethane disulfonic anhydride and propane disulfonic anhydride; an anhydride of carboxylic acid and sulfonic acid such as sulfobenzoic anhydride, sulfopropionic anhydride, and sulfobutyric anhydride and the like. Specially, sulfobenzoic anhydride or sulfopropionic anhydride is preferable. The anhydrides may be used singly, or a plurality thereof may be used by mixture.

The secondary battery is manufactured, for example, by the following procedure.

First, the cathode 121 is formed. First, a cathode active material, a binder, and an electrical conductor are mixed to prepare a cathode mixture, which is dispersed in an organic solvent to obtain paste cathode mixture slurry. Subsequently, both faces of the cathode current collector 121A are uniformly coated with the cathode mixture slurry by using a doctor blade, a bar coater or the like, which is dried. Finally, the coating is compression-molded by using a rolling press machine or the like while being heated if necessary to form the cathode active material layer 121B. In this case, the resultant may be compression-molded over several times.

Further, the anode 122 is formed by forming the anode active material layer 122B on both faces of the anode current collector 122A by the same procedure as that of forming the anode described above.

Next, the spirally wound electrode body 120 is formed by using the cathode 121 and the anode 122. First, the cathode lead 125 is attached to the cathode current collector 121A by welding or the like, and the anode lead 126 is attached to the anode current collector 122A by welding and the like. After that, the cathode 121 and the anode 122 are layered with the separator 123 in between and then are spirally wound in the longitudinal direction, and thereby the spirally wound electrode body 120 is formed. The center pin 124 is inserted in the center of the spirally wound electrode body. Subsequently, the spirally wound electrode body 120 is sandwiched between the pair of insulating plates 112 and 113, and contained inside the battery can 11. The end of the cathode lead 125 is welded to the safety valve mechanism 115, and the end of the anode lead 126 is welded to the battery can 111. Finally, an electrolytic solution is injected into the battery can 111 and impregnated in the separator 123. After that, at the open end of the battery can 111, the battery cover 114, the safety valve mechanism 115, and the PTC device 116 are fixed by being caulked with the gasket 117. The secondary battery illustrated in FIG. 3 and FIG. 4 is thereby completed.

In the secondary battery, when charged, for example, lithium ions are extracted from the cathode 121, and the extracted lithium ions are inserted in the anode 122 through the electrolytic solution impregnated in the separator 123. Meanwhile, when discharged, for example, lithium ions are extracted from the anode 122, and inserted in the cathode 121 through the electrolytic solution impregnated in the separator 123.

According to the cylindrical secondary battery, the anode 122 has the structure similar to that of the anode illustrated in FIG. 1 described above, and is formed by the method similar to that of the method of manufacturing the anode described above. Therefore, the contact force of the anode active material layer 122B to the anode current collector 122A is improved. Further, the anode active material layer 122B itself becomes physically rigid. Therefore, the electric resistance between the anode current collector 122A and the anode active material layer 122B is lowered and lithium is effectively inserted and extracted in charge and discharge, and collapse of the anode active material layer 122B associated with charge and discharge is prevented. Further, a ratio from 0.1% to 17.29% both inclusive of silicon contained in the anode active material exists as Si—C bond, and thereby reaction between the anode active material and the electrolytic solution is prevented. Accordingly, superior cycle characteristics are obtained. In addition, since the anode 122 contains silicon, it is advantageous to realizing a high capacity as well.

Second Secondary Battery

Figure 5:
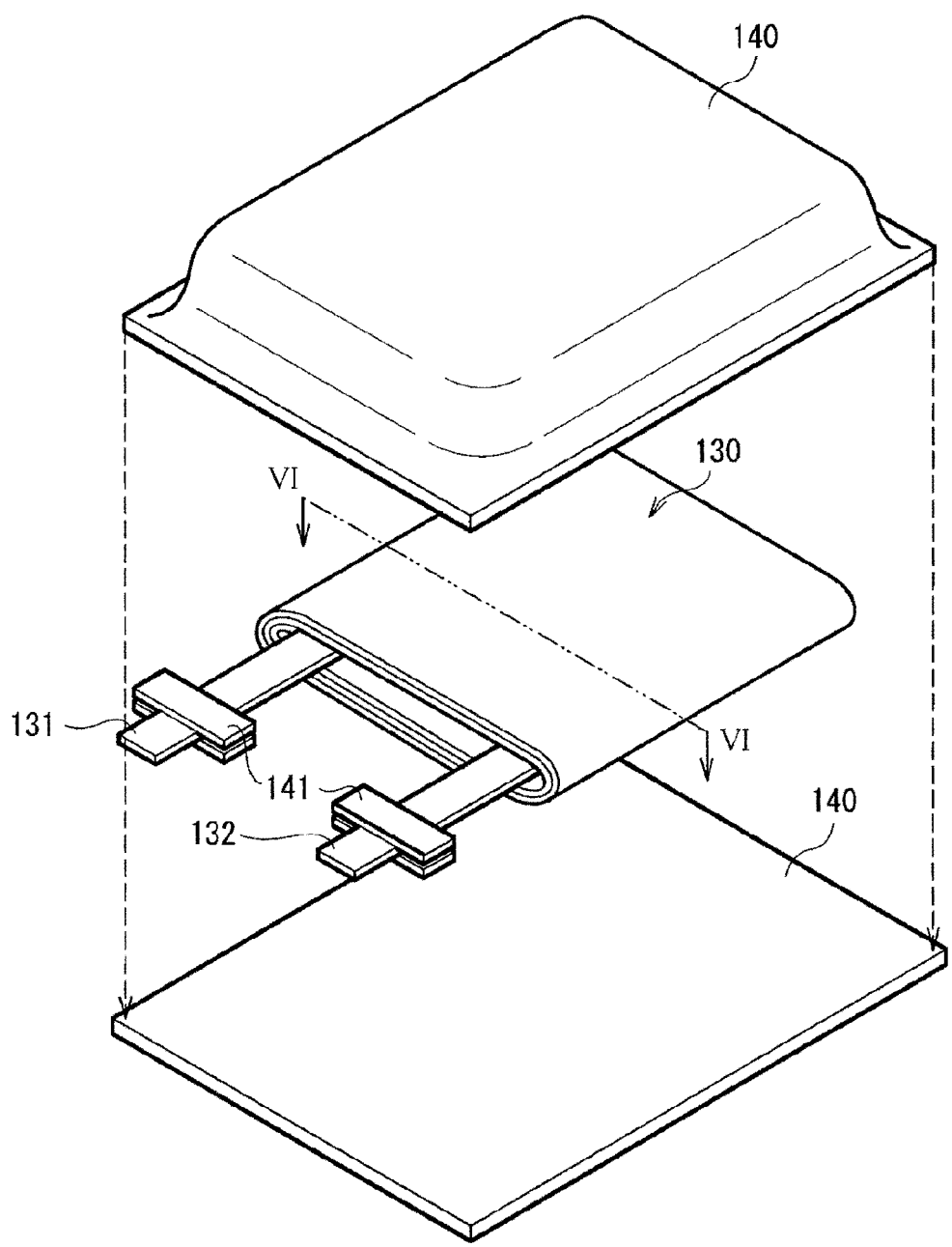
FIG. 5 is an exploded perspective view illustrating a structure of a second battery using the anode according to the embodiment of the invention.
Figure 6:
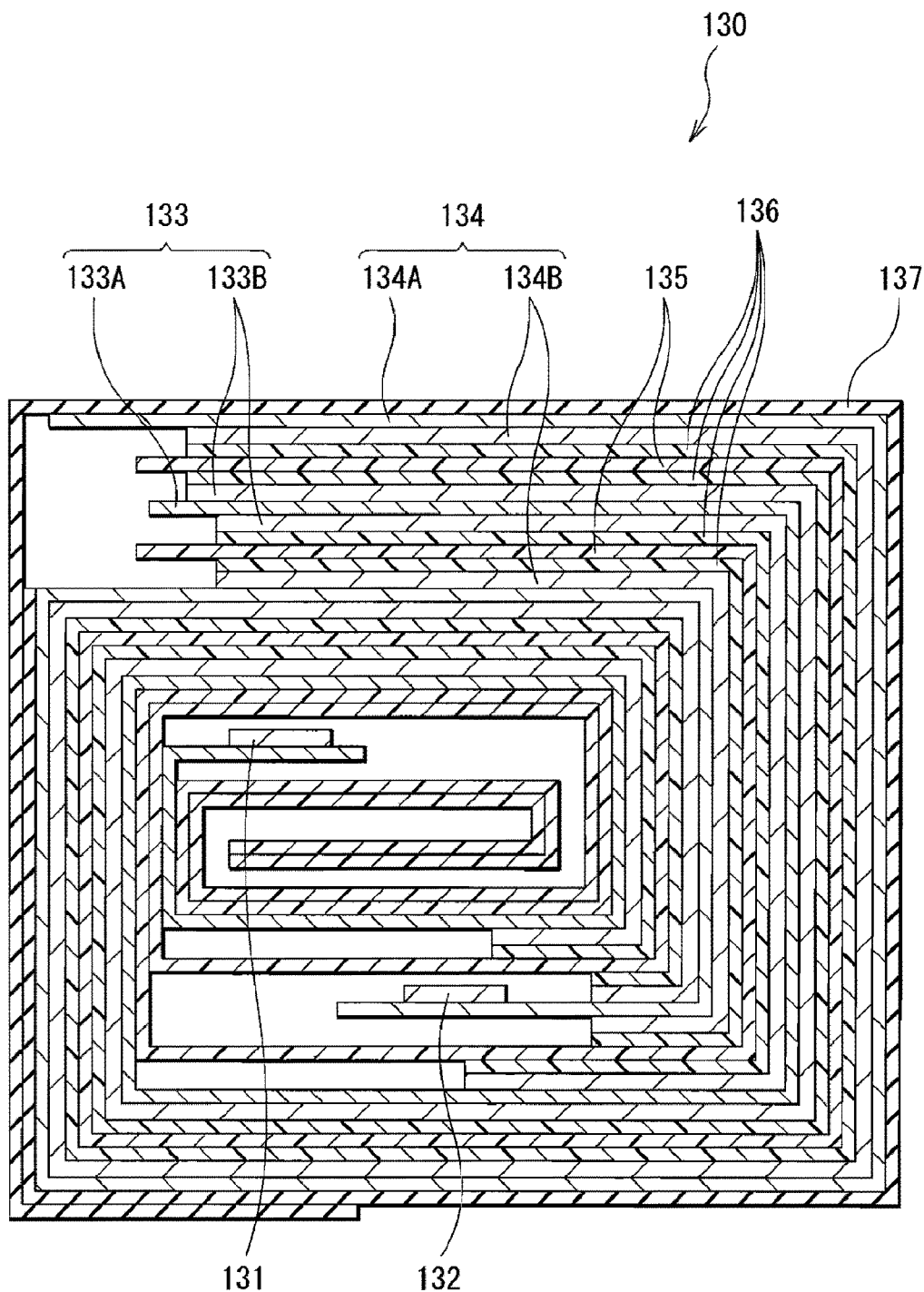
FIG. 6 is a cross sectional view illustrating a structure taken along section line VII-VII of the spirally wound electrode body illustrated in FIG. 5.

FIG. 5 illustrates an exploded perspective structure of a second secondary battery. FIG. 6 illustrates an enlarged cross section taken along line VI-VI of a spirally wound electrode body 130 illustrated in FIG. 5. The secondary battery is, for example, a lithium ion secondary battery as the foregoing first secondary battery. In the secondary battery, a spirally wound electrode body 130 to which a cathode lead 131 and an anode lead 132 are attached is contained in a film package member 140. The battery structure including the film package member 140 is called laminated film type.

The cathode lead 131 and the anode lead 132 are respectively derived in the same direction from inside to outside of the package member 140. The cathode lead 131 is made of, for example, a metal material such as aluminum. The anode lead 132 is made of, for example, a metal material such as copper, nickel, and stainless. Each metal material is in the shape of, for example, a thin plate or mesh.

The package member 140 is made of an aluminum laminated film in which, for example, a nylon film, an aluminum foil, and a polyethylene film are bonded together in this order. The package member 140 has a structure in which, for example, the respective outer edges of two rectangle aluminum laminated films are contacted to each other by fusion bonding or an adhesive so that the polyethylene film and the spirally wound electrode body 130 are opposed to each other.

Adhesive films 141 to protect from the entering of outside air are inserted between the package member 140 and the cathode lead 131, the anode lead 132. The adhesive film 141 is made of a material having adhesion to the cathode lead 131 and the anode lead 132. Examples of such materials include a polyolefin resin such as polyethylene, polypropylene, modified polyethylene, and modified polypropylene.

The package member 140 may be made of a laminated film having other laminated structure, a polymer film made of polypropylene or the like, or a metal film, instead of the foregoing aluminum laminated film.

In the spirally wound electrode body 130, a cathode 133 and an anode 134 are layered with a separator 135 and an electrolyte layer 136 in between and then spirally wound. The outermost periphery thereof is protected by a protective tape 137.

Figure 7:
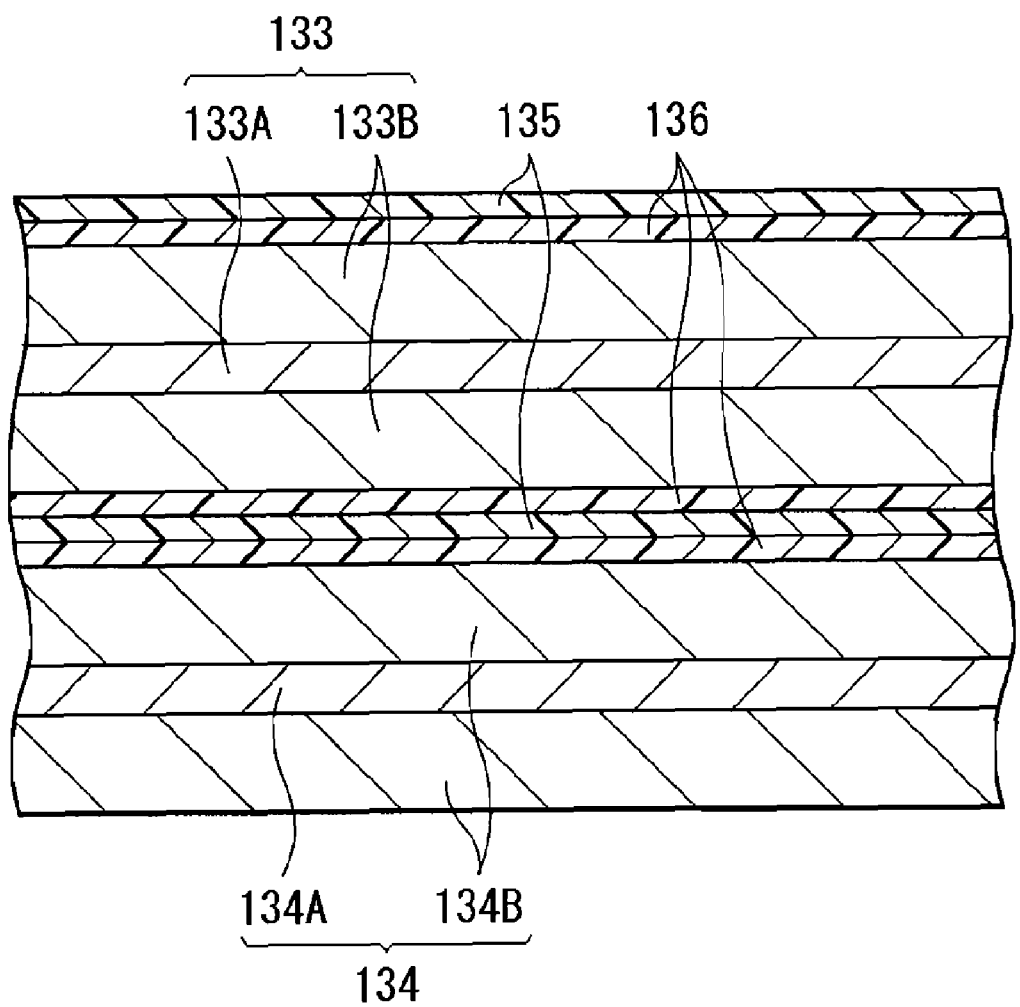
FIG. 7 is a cross sectional view illustrating an enlarged part of the spirally wound electrode body illustrated in FIG. 6.

FIG. 7 illustrates an enlarged part of the spirally wound electrode body 130 illustrated in FIG. 6. The cathode 133 has, for example, a structure in which a cathode active material layer 133B is provided on both faces of a cathode current collector 133A having a pair of faces. The anode 134 has a structure similar to that of the foregoing anode. For example, the anode 134 has a structure in which an anode active material layer 134B is provided on both faces of an anode current collector 134A having a pair of faces. Structures of the cathode current collector 133A, the cathode active material layer 133B, the anode current collector 134A, the anode active material layer 134B, and the separator 135 are respectively similar to those of the cathode current collector 121A, the cathode active material layer 121B, the anode current collector 122A, the anode active material layer 122B, and the separator 123 in the first secondary battery described above.

The electrolyte 136 is a so-called gel electrolyte, containing an electrolytic solution and a polymer compound that holds the electrolytic solution. The gel electrolyte is preferable, since a high ion conductivity (for example, 1 mS/cm or more at room temperature) is thereby obtained, and leakage of the battery is thereby prevented.

Examples of polymer compounds include an ether polymer compound such as polyethylene oxide, a cross-linked body containing polyethylene oxide, and polypropylene oxide, an acrylate or ester polymer compound such as polymethylmethacrylate, polyacrylic acid, and polymethacrylate, a fluorinated polymer compound such as polyvinylidene fluoride, a copolymer of polyvinylidene fluoride and polyhexafluoropropylene, polytetrafluoroethylene, and polyhexafluoropropylene and the like. In addition, examples of polymer compounds include polyacrylonitrile, polyphosphazene, polysiloxane, polyvinyl acetate, polyvinyl alcohol, styrene-butadiene rubber, nitrile-butadiene rubber, polystyrene, polycarbonate and the like. One thereof may be used singly, or a plurality thereof may be used by mixture. Specially, as a polymer compound, the fluorinated polymer compound such as polyvinylidene fluoride is preferable, since the redox stability is high and thus the electrochemical stability is high. The content of the polymer compound in the electrolytic solution varies according to compatibility between the electrolytic solution and the polymer compound, but, for example, is preferably from 5 wt % to 50 wt % both inclusive.

The composition of the electrolytic solution is similar to the composition of the electrolytic solution in the first secondary battery. However, the solvent in this case means a wide concept including not only the liquid solvent but also a solvent having ion conductivity capable of dissociating the electrolyte salt. Therefore, in the case where the polymer compound having ion conductivity is used, the polymer compound is also included in the solvent.

Instead of the gel electrolyte 136 in which the electrolytic solution is held by the polymer compound, the electrolytic solution may be directly used. In this case, the electrolytic solution is impregnated in the separator 135.

The secondary battery including the gel electrolyte 136 is manufactured, for example, by the following three methods.

In the first manufacturing method, first, for example, the cathode 133 is formed by forming the cathode active material layer 133B on both faces of the cathode current collector 133A and the anode 134 is formed by forming the anode active material layer 134B on both faces of the anode current collector 134A by procedures similar to the procedures of forming the cathode 121 and the anode 122 in the foregoing first secondary battery. Subsequently, a precursor solution containing an electrolytic solution, a polymer compound, and a solvent is prepared. After the cathode 133 and the anode 134 are coated with the precursor solution, the solvent is volatilized to form the gel electrolyte 136. Subsequently, the cathode lead 131 is attached to the cathode 133, and the anode lead 132 is attached to the anode 134. Subsequently, the cathode 133 and the anode 134 provided with the electrolyte 136 are layered with the separator 135 in between to obtain a laminated body. After that, the laminated body is spirally wound in the longitudinal direction, the protective tape 137 is adhered to the outermost periphery thereof to form the spirally wound electrode body 130. Finally, for example, after the spirally wound electrode body 130 is sandwiched between two pieces of the film package members 140, outer edges of the package members 140 are contacted by thermal fusion bonding or the like to enclose the spirally wound electrode body 130. At this time, the adhesive films 141 are inserted between the cathode lead 131, the anode lead 132 and the package member 140. Thereby, the secondary battery illustrated in FIG. 5 to FIG. 7 is completed.

In the second manufacturing method, first, the cathode lead 131 is attached to the cathode 133 and the anode lead 132 is attached to the anode 134. After that, the cathode 133 and the anode 134 are layered with the separator 135 in between and spirally wound. The protective tape 137 is adhered to the outermost periphery thereof, and thereby a spirally wound body as a precursor of the spirally wound electrode body 130 is formed. Subsequently, after the spirally wound body is sandwiched between two pieces of the film package members 140, the outermost peripheries except for one side are bonded by thermal fusion bonding or the like to obtain a pouched state, and the spirally wound body is contained in the pouch-like package member 140. Subsequently, a composition of matter for electrolyte containing an electrolytic solution, a monomer as a raw material for the polymer compound, a polymerization initiator, and if necessary other material such as a polymerization inhibitor is prepared, which is injected into the pouch-like package member 140. After that, the opening of the package member 140 is hermetically sealed by thermal fusion bonding or the like. Finally, the monomer is thermally polymerized to obtain a polymer compound. Thereby, the gel electrolyte 136 is formed. Accordingly, the secondary battery is completed.

In the third manufacturing method, the spirally wound body is formed and contained in the pouch-like package member 140 in the same manner as that of the foregoing second manufacturing method, except that the separator 135 with both faces coated with a polymer compound firstly is used. Examples of polymer compounds with which the separator 135 is coated include a polymer containing vinylidene fluoride as a component, that is, a homopolymer, a copolymer, a multicomponent copolymer and the like. Specifically, examples thereof include polyvinylidene fluoride, a binary copolymer containing vinylidene fluoride and hexafluoropropylene as a component, a ternary copolymer containing vinylidene fluoride, hexafluoropropylene, and chlorotrifluoroethylene as a component and the like. As a polymer compound, in addition to the foregoing polymer containing vinylidene fluoride as a component, another one or more polymer compounds may be contained. Subsequently, an electrolytic solution is prepared and injected into the package member 140. After that, the opening of the package member 140 is sealed by thermal fusion bonding or the like. Finally, the resultant is heated while a weight is applied to the package member 140, and the separator 135 is contacted to the cathode 133 and the anode 134 with the polymer compound in between. Thereby, the electrolytic solution is impregnated into the polymer compound, and the polymer compound is gelated to form the electrolyte 136. Accordingly, the secondary battery is completed.

In the third manufacturing method, the swollenness of the secondary battery is prevented compared to in the first manufacturing method. Further, in the third manufacturing method, the monomer, the solvent and the like as a raw material of the polymer compound are hardly left in the electrolyte 136 compared to the second manufacturing method, and the formation step of the polymer compound is favorably controlled. Thus, sufficient adhesion are obtained between the cathode 133/the anode 134/the separator 135 and the electrolyte 136.

In the secondary battery, as in the foregoing first battery, lithium ions are inserted and extracted between the cathode 133 and the anode 134. That is, when charged, for example, lithium ions are extracted from the cathode 133 and inserted in the anode 134 through the electrolyte 136. Meanwhile, when discharged, for example, lithium ions are extracted from the anode 134, and inserted in the cathode 133 through the electrolyte 136.

According to the laminated film secondary battery, the anode 134 has a structure similar to that of the foregoing anode illustrated in FIG. 1, and the anode 134 is formed by a method similar to the method of manufacturing the foregoing anode. Therefore, the cycle characteristics are thereby improved.

Third Battery

Figure 8:
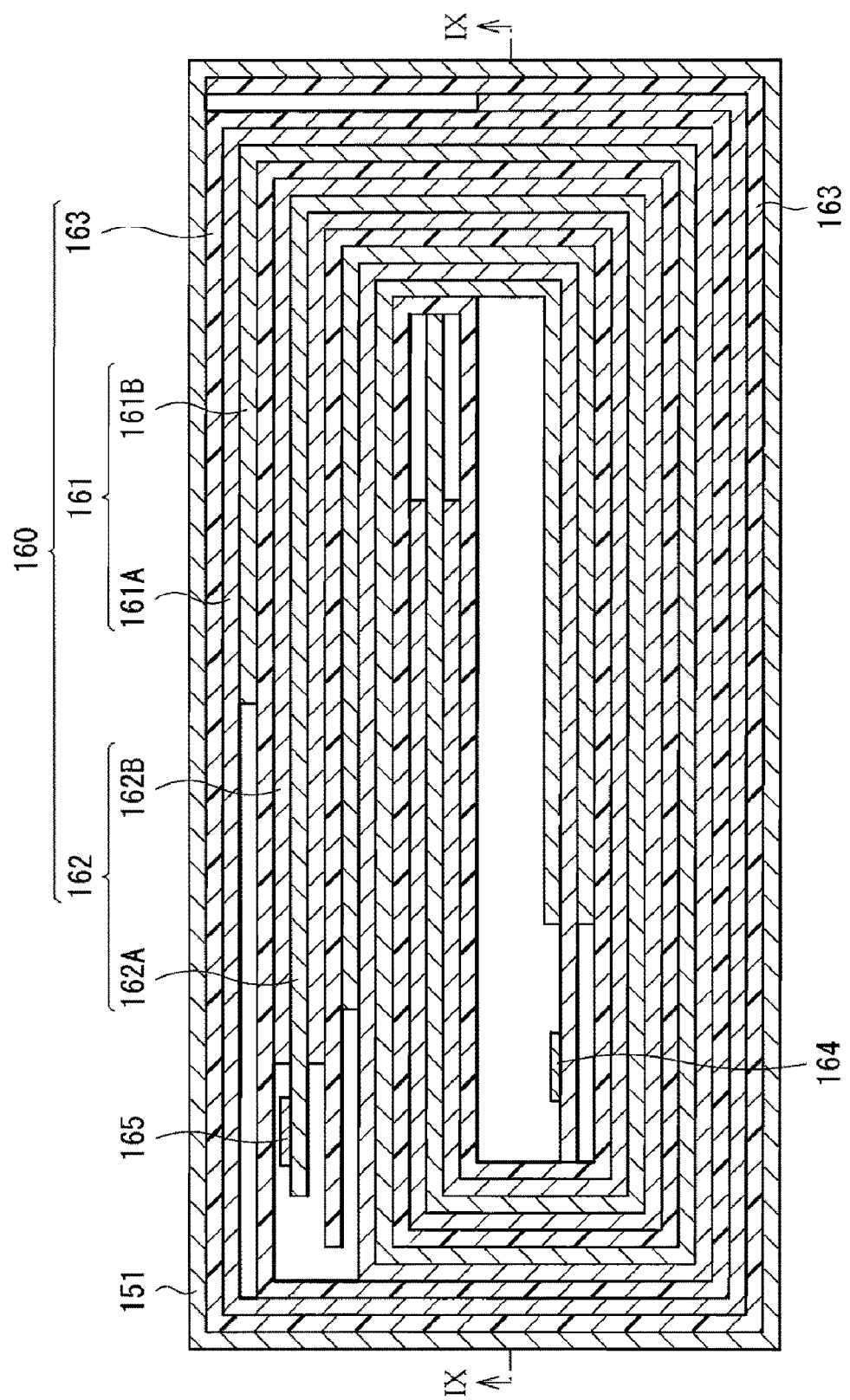
FIG. 8 is a cross sectional view illustrating a structure of a third battery using the anode according to the embodiment of the invention.
Figure 9:
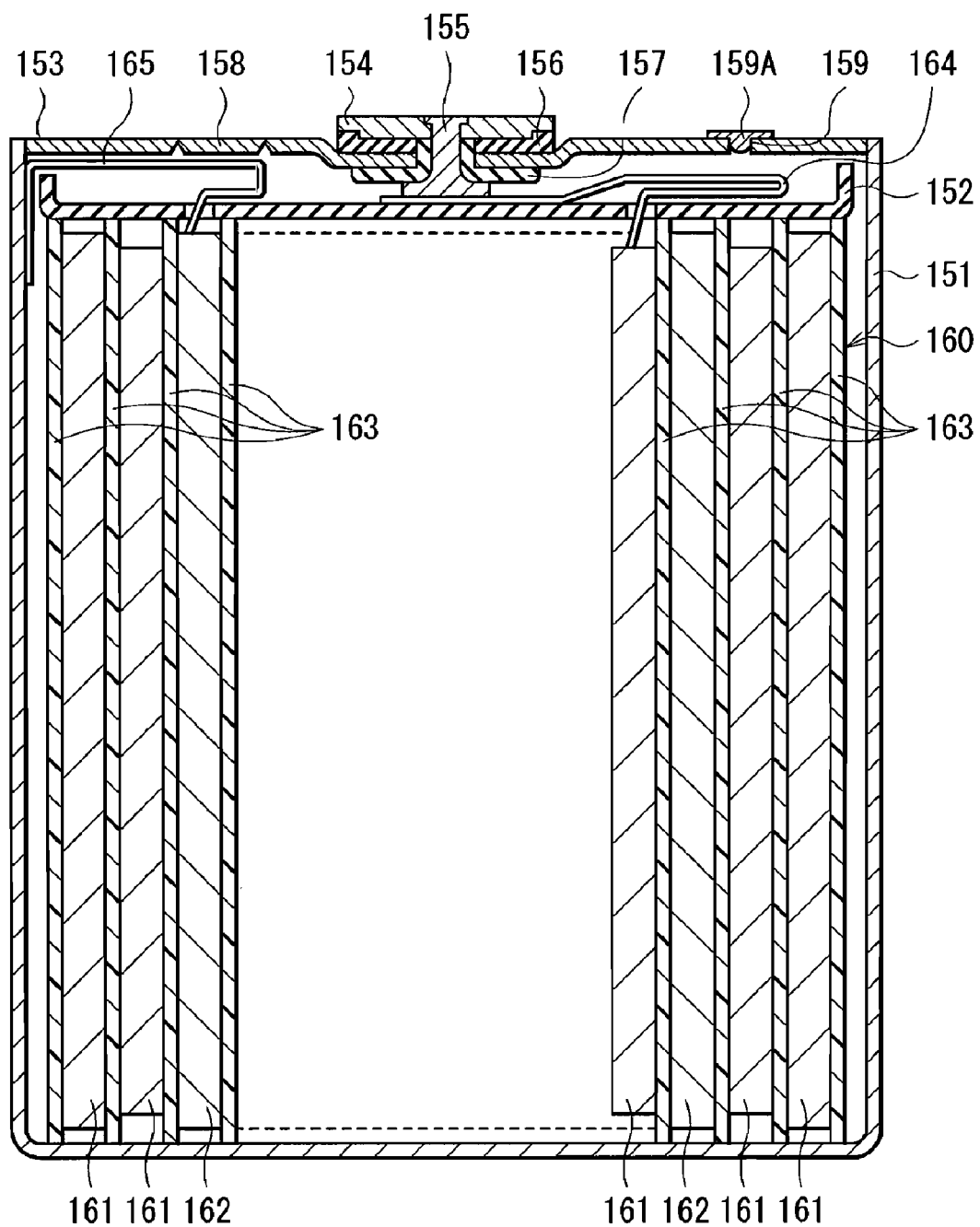
FIG. 9 is a cross sectional view illustrating a structure taken along section line X-X of the spirally wound electrode body illustrated in FIG. 8.

FIG. 8 and FIG. 9 illustrate a cross sectional structure of a third secondary battery. The cross section illustrated in FIG. 8 and the cross section illustrated in FIG. 9 are perpendicular to each other as the positional relation. That is, FIG. 9 is a cross sectional view taken along line IX-IX illustrated in FIG. 8. The secondary battery is a so-called square type battery and is a lithium ion secondary battery in which a flat spirally wound electrode body 160 is contained in a package can 151 in the shape of an approximate hollow rectangular solid.

The package can 151 is made of, for example, iron (Fe) plated by nickel (Ni). The package can 151 also has a function as an anode terminal. One end of the package can 151 is closed and the other end thereof is opened. At the open end of the package can 151, an insulating plate 152 and a battery cover 153 are attached, and thereby inside of the battery package 151 is hermetically closed. The insulating plate 152 is made of, for example, polypropylene or the like, and is arranged perpendicular to the spirally wound circumferential face on the spirally wound electrode body 160. The battery cover 153 is, for example, made of a material similar to that of the battery package 151, and also has a function as an anode terminal together with the package can 151. Outside of the battery cover 153, a terminal plate 154 as a cathode terminal is arranged. In the approximate center of the battery cover 153, a through-hole is provided. A cathode pin 155 electrically connected to the terminal plate 154 is inserted in the through-hole. The terminal plate 154 is electrically insulated from the battery cover 153 with an insulating case 156 in between. The cathode pin 155 is electrically insulated from the battery cover 153 with a gasket 157 in between. The insulating case 156 is made of, for example, polybutylene terephthalate or the like. The gasket 157 is made of, for example, an insulating material, and the surface thereof is coated with asphalt.

In the vicinity of the rim of the battery cover 153, a cleavage valve 158 and an electrolytic solution injection hole 159 are provided. The cleavage valve 158 is electrically connected to the battery cover 153. When the internal pressure of the battery becomes a certain level or more by internal short circuit, external heating or the like, the cleavage valve 158 is cleaved to prevent internal pressure rise. The electrolytic solution injection hole 159 is sealed by a sealing member 159A made of, for example, a stainless steel ball.

In the spirally wound electrode body 160, a cathode 161 and an anode 162 are layered with a separator 163 in between, and are spirally wound. The spirally wound electrode body 160 is shaped flat according to the shape of the package can 151. The separator 163 is located at the outermost circumference of the spirally wound electrode body 160, and the cathode 161 is located just inside thereof. FIG. 9 is a simplified view of the laminated structure of the cathode 161 and the anode 162. The spirally winding number of the spirally wound electrode body 160 is not limited to the number illustrated in FIG. 8 and FIG. 9, but may be arbitrarily set. A cathode lead 164 made of aluminum (Al) or the like is connected to the cathode 161 of the spirally wound electrode body 160. An anode lead 165 made of nickel or the like is connected to the anode 162. The cathode lead 164 is electrically connected to the terminal plate 154 by being welded to the lower end of the cathode pin 155. The anode lead 165 is welded and electrically connected to the package can 151.

As illustrated in FIG. 8, in the cathode 161, a cathode active material layer 161B is provided on a single face or both faces of a cathode current collector 161A. In the anode 162, an anode active material layer 162B is provided on a single face or both faces of an anode current collector 162A. Structures of the cathode current collector 161A, the cathode active material layer 161B, the anode current collector 162A, the anode active material layer 162B, and the separator 163 are respectively similar to the structures of the cathode current collector 121A, the cathode active material layer 121B, the anode current collector 122A, the anode active material layer 122B, and the separator 123 in the first battery described above. An electrolytic solution similar to that of the separator 123 is impregnated in the separator 163.

The secondary battery may be manufactured, for example, as follows.

As in the foregoing first battery, the cathode 161 and the anode 162 are layered with the separator 163 in between and spirally wound, and thereby the spirally wound electrode body 160 is formed. After that, the spirally wound electrode body 160 is contained in the package can 151. Next, the insulating plate 152 is arranged on the spirally wound electrode body 160. The anode lead 165 is welded to the battery package 151, the cathode lead 164 is welded to the lower end of the cathode pin 155, and the battery cover 153 is fixed on the open end of the battery package 151 by laser welding. Finally, the electrolytic solution is injected into the package can 151 through the electrolytic solution injection hole 159, and impregnated in the separator 163. After that, the electrolytic solution injection hole 159 is sealed by the sealing member 159A. The secondary battery illustrated in FIG. 8 and FIG. 9 is thereby completed.

According to the secondary battery, the anode 162 has the structure similar to that of the anode illustrated in FIG. 1 described above. In addition, the anode 162 is formed by a method similar to the foregoing method of manufacturing the anode. Accordingly, the cycle characteristics are improved.

EXAMPLES

A specific example of the invention will be described in detail.

Examples 1-1 to 1-71

Square secondary batteries illustrated in FIG. 8 and FIG. 9 were manufactured by the following procedure. The secondary battery was formed as a lithium ion secondary battery in which the capacity of the anode 162 was expressed based on insertion and extraction of lithium.

First, the cathode 161 was formed. That is, lithium carbonate ($Li_2CO_3$) and cobalt carbonate ($CoCO_3$) were mixed at a molar ratio of 0.5:1. After that, the mixture was fired in the air at 900 deg C. for 5 hours. Thereby, lithium cobalt complex oxide ($LiCoO_2$) was obtained. Subsequently, 96 parts by mass of the lithium cobalt complex oxide as a cathode active material, 1 part by mass of graphite as an electrical conductor, and 3 parts by mass of polyvinylidene fluoride as a binder were mixed to obtain a cathode mixture. After that, the cathode mixture was dispersed in N-methyl-2-pyrrolidone to obtain paste cathode mixture slurry. Finally, both faces of the cathode current collector 161A made of a strip-shaped aluminum foil (thickness: 15 μm) were uniformly coated with the cathode mixture slurry, which was dried. After that, the resultant was compression-molded by a roll pressing machine to form the cathode active material layer 161B. After that, the cathode lead 164 made of aluminum was welded and attached to an end of the cathode current collector 161A.

Next, the anode 162 was formed. Specifically, the anode current collector 162A (thickness: 20 μm, ten point height of roughness profile Rz: 3.5 μm) made of an electrolytic copper foil was prepared. After that, silicon as an anode active material was deposited on both faces of the anode current collector 162A by electron beam evaporation method with the use of the evaporation apparatus in FIG. 1 described in the foregoing embodiment. Thereby, the anode active material particles were formed into a single layer structure to obtain the anode active material layer 162B. As an evaporation source, single crystal silicon having purity of 99.999% or more added with a certain amount of carbon was used. While oxygen gas was continuously introduced into the evaporation treatment bath 2, evaporation was made at a deposition rate of 300 nm/sec, and thereby the anode active material layer 162B being 7 μm thick was formed. The contents of carbon and oxygen contained as an anode active material varied according to each example as shown in after-mentioned Table 1 to Table 4. More specifically, the content of carbon was from 0.2 atomic % to 10 atomic % both inclusive, and the content of oxygen was from 0.5 atomic % to 40 atomic % both inclusive. After that, the anode lead 165 made of nickel was welded and attached to one end of the anode current collector 162A.

Subsequently, the separator 163 made of a microporous polyethylene film being 23 μm thick was prepared. The cathode 161, the separator 163, the anode 162, and the separator 163 were layered sequentially to form a laminated body. The resultant laminated body was spirally wound several times, and thereby the spirally wound electrode body 160 was formed. The obtained spirally wound electrode body 160 was shaped into a flat shape.

Next, the flat-shaped spirally wound electrode body 160 was contained in the package can 151. After that, the insulating plate 152 was arranged on the spirally wound electrode body 160. The anode lead 165 was welded to the package can 151, the cathode lead 144 was welded to the lower end of the cathode pin 155, and the battery cover 153 was fixed on the open end portion of the package can 151 by laser welding. After that, an electrolytic solution was injected into the package can 151 through the electrolytic solution injection hole 159. As the electrolytic solution, an electrolytic solution obtained by dissolving $LiPF_6$ as an electrolyte salt at a concentration of 1 mol/$dm^3$ into a mixed solvent of 30 wt % of ethylene carbonate (EC), 60 wt % of diethyl carbonate (DEC), and 10 wt % of vinylene carbonate (VC) was used. Finally, the electrolytic solution injection hole 159 was sealed by the sealing member 159A, and thereby a square type secondary battery was obtained.

Comparative Examples 1 to 12

Each secondary battery of Comparative examples 1 to 12 was fabricated in the same manner as that of Example 1, except that the contents of carbon and oxygen contained as an anode active material were changed as shown in Table 1. Specifically, the content of oxygen was out of the range from 0.2 atomic % to 10 atomic % both inclusive, and the content of oxygen was out of the range from 0.5 atomic % to 40 atomic % both inclusive.

For the secondary batteries of each example and each comparative example fabricated as above, the cycle characteristics were examined, and the bonding state of silicon contained in the anode active material (existence ratio as Si—C bond) was examined as well. The results are shown in Table 1 to Table 5.

TABLE 1

|  | Carbon content (at %) | Oxygen content (at %) | Ratio of silicon existing as Si—C bond (%) | Cycle characteristics (%) |
|---|---|---|---|---|
| Example 1-1 | 0.2 | 0.5 | 0.16 | 71 |
| Example 1-2 | 0.2 | 39.8 | 0.29 | 70 |
| Example 1-3 | 9.9 | 0.5 | 8.51 | 71 |
| Example 1-4 | 10.0 | 39.7 | 12.13 | 72 |
| Example 1-5 | 9.4 | 39.2 | 2.56 | 69 |
| Example 1-6 | 9.5 | 39.0 | 3.32 | 69 |
| Example 1-7 | 9.4 | 39.0 | 6.01 | 69 |
| Example 1-8 | 9.7 | 38.7 | 7.33 | 71 |
| Example 1-9 | 9.5 | 38.8 | 8.09 | 72 |
| Example 1-10 | 9.8 | 38.5 | 8.91 | 75 |
| Example 1-11 | 9.7 | 38.4 | 10.84 | 72 |
| Example 1-12 | 9.8 | 38.6 | 12.16 | 72 |
| Example 1-13 | 9.6 | 38.0 | 16.31 | 71 |

TABLE 1-continued

|  | Carbon content (at %) | Oxygen content (at %) | Ratio of silicon existing as Si—C bond (%) | Cycle characteristics (%) |
|---|---|---|---|---|
| Example 1-14 | 9.5 | 38.3 | 17.29 | 70 |
| Example 1-15 | 0.2 | 0.6 | 0.10 | 67 |
| Example 1-16 | 0.2 | 0.7 | 0.11 | 70 |
| Example 1-17 | 0.2 | 0.7 | 0.13 | 74 |
| Example 1-18 | 0.4 | 0.8 | 0.31 | 78 |
| Example 1-19 | 0.5 | 0.5 | 0.44 | 79 |

TABLE 2

|  | Carbon content (at %) | Oxygen content (at %) | Ratio of silicon existing as Si—C bond (%) | Cycle characteristics (%) |
|---|---|---|---|---|
| Example 1-20 | 0.2 | 11.3 | 0.19 | 75 |
| Example 1-21 | 0.4 | 11.1 | 0.37 | 77 |
| Example 1-22 | 0.7 | 11.4 | 0.66 | 77 |
| Example 1-23 | 0.9 | 11.0 | 0.85 | 78 |
| Example 1-24 | 1.3 | 11.2 | 1.22 | 79 |
| Example 1-25 | 1.6 | 11.3 | 1.49 | 80 |
| Example 1-26 | 1.8 | 11.3 | 1.72 | 81 |
| Example 1-27 | 2.3 | 11.6 | 2.19 | 81 |
| Example 1-28 | 2.6 | 11.2 | 2.44 | 82 |
| Example 1-29 | 3.0 | 11.1 | 2.83 | 82 |
| Example 1-30 | 3.3 | 11.1 | 3.08 | 81 |
| Example 1-31 | 3.9 | 11.4 | 3.64 | 81 |
| Example 1-32 | 4.5 | 11.2 | 4.22 | 79 |
| Example 1-33 | 4.7 | 11.0 | 4.35 | 78 |
| Example 1-34 | 5.0 | 11.3 | 4.72 | 74 |
| Example 1-35 | 5.8 | 11.1 | 5.44 | 73 |
| Example 1-36 | 6.5 | 11.4 | 6.02 | 74 |
| Example 1-37 | 7.7 | 11.1 | 7.21 | 73 |
| Example 1-38 | 8.1 | 11.2 | 7.53 | 72 |
| Example 1-39 | 9.2 | 11.0 | 8.53 | 73 |
| Example 1-40 | 9.8 | 11.0 | 9.16 | 72 |

TABLE 3

|  | Carbon content (at %) | Oxygen content (at %) | Ratio of silicon existing as Si—C bond (%) | Cycle characteristics (%) |
|---|---|---|---|---|
| Example 1-41 | 2.6 | 0.5 | 2.07 | 72 |
| Example 1-42 | 2.7 | 0.8 | 2.21 | 73 |
| Example 1-43 | 2.7 | 2.1 | 2.24 | 74 |
| Example 1-44 | 2.8 | 3.0 | 2.32 | 78 |
| Example 1-45 | 2.5 | 5.0 | 2.14 | 79 |
| Example 1-46 | 2.9 | 7.2 | 2.55 | 78 |
| Example 1-47 | 2.7 | 9.3 | 2.49 | 79 |
| Example 1-48 | 2.7 | 13.3 | 2.60 | 83 |
| Example 1-49 | 2.6 | 15.0 | 2.59 | 82 |
| Example 1-50 | 2.9 | 18.2 | 3.05 | 84 |
| Example 1-51 | 2.8 | 20.1 | 3.01 | 84 |
| Example 1-52 | 2.6 | 22.3 | 2.91 | 81 |
| Example 1-53 | 2.6 | 24.8 | 3.01 | 80 |
| Example 1-54 | 2.6 | 27.9 | 3.14 | 75 |
| Example 1-55 | 2.7 | 31.2 | 3.43 | 75 |
| Example 1-56 | 2.7 | 35.0 | 3.73 | 74 |
| Example 1-57 | 2.8 | 37.2 | 4.11 | 74 |
| Example 1-58 | 2.9 | 39.8 | 4.35 | 75 |

TABLE 4

|  | Carbon content (at %) | Oxygen content (at %) | Ratio of silicon existing as Si—C bond (%) | Cycle characteristics (%) |
|---|---|---|---|---|
| Example 1-59 | 0.3 | 5.2 | 0.26 | 75 |
| Example 1-60 | 0.2 | 15.3 | 0.20 | 79 |
| Example 1-61 | 0.4 | 20.8 | 0.42 | 81 |
| Example 1-62 | 0.4 | 25.0 | 0.46 | 78 |
| Example 1-63 | 0.5 | 30.6 | 0.63 | 74 |
| Example 1-64 | 6.2 | 5.0 | 5.17 | 72 |
| Example 1-65 | 6.6 | 15.1 | 6.49 | 78 |
| Example 1-66 | 6.6 | 20.1 | 7.20 | 79 |
| Example 1-67 | 6.3 | 25.3 | 7.55 | 76 |
| Example 1-68 | 6.1 | 29.8 | 7.99 | 73 |
| Example 1-69 | 9.3 | 5.0 | 7.81 | 73 |
| Example 1-70 | 9.2 | 11.0 | 8.53 | 73 |
| Example 1-71 | 8.9 | 14.8 | 8.75 | 77 |
| Example 1-72 | 9.0 | 20.0 | 9.89 | 79 |
| Example 1-73 | 9.2 | 25.3 | 11.38 | 75 |
| Example 1-74 | 9.1 | 31.4 | 11.93 | 71 |

TABLE 5

|  | Carbon content (at %) | Oxygen content (at %) | Ratio of silicon existing as Si—C bond (%) | Cycle characteristics (%) |
|---|---|---|---|---|
| Comparative example 1-1 | 0.0 | 0.3 | — | 68 |
| Comparative example 1-2 | 12.3 | 43.0 | 0.16 | 71 |
| Comparative example 1-3 | 9.7 | 38.2 | 18.25 | 59 |
| Comparative example 1-4 | 9.9 | 38.3 | 18.92 | 55 |
| Comparative example 1-5 | 0.2 | 0.4 | 0.00 | 32 |
| Comparative example 1-6 | 0.4 | 0.7 | 0.06 | 41 |
| Comparative example 1-7 | 0.3 | 0.6 | 0.07 | 45 |
| Comparative example 1-8 | 0.3 | 0.8 | 0.09 | 48 |
| Comparative example 1-9 | 0.1 | 11.0 | 0.09 | 69 |
| Comparative example 1-10 | 11.7 | 11.0 | 11.20 | 64 |
| Comparative example 1-11 | 2.6 | 0.2 | 2.06 | 68 |
| Comparative example 1-12 | 2.8 | 42.2 | 4.48 | 69 |

In examining the cycle characteristics, a cycle test was performed by the following procedure and thereby the discharge capacity retention ratio was obtained. First, to stable the battery state, charge and discharge were performed 1 cycle in the atmosphere at 25 deg C., and then charge and discharge were performed again to measure the discharge capacity at the second cycle. Subsequently, charge and discharge were performed 98 cycles in the same atmosphere to measure the discharge capacity at the 100th cycle. Finally, the discharge capacity retention ratio (%)=(discharge capacity at the 100th cycle/discharge capacity at the second cycle)×100 was calculated. For the first cycle, first, constant current charge was performed at the constant current density of 0.2 mA/cm$^2$ until the battery voltage reached 4.2 V, constant voltage charge was continuously performed at the constant voltage of 4.2 V until the current density reached 0.05 mA/cm$^2$, and constant current discharge was performed at the constant current density of 0.2 mA/cm$^2$ until the battery voltage reached 2.5 V. For each cycle on and after the second cycle, first, constant current charge was performed at the constant current density of 2 mA/cm$^2$ until the battery voltage reached 4.2 V, constant voltage charge was continuously performed at the constant voltage of 4.2 V until the current density reached 0.1 mA/cm$^2$, and constant current discharge was performed at the constant current density of 2 mA/cm$^2$ until the battery voltage reached 2.5 V.

For examining the bonding state of carbon contained in the anode active material, by using X-ray Photoelectron Spectroscopy with the use of Quantum 2000 photoelectron spectrometer of Ulvac-Phi, Inc., Si—C bond and Si—Si bond were identified, and a ratio existing as Si—C bond among silicon contained in the anode active material was obtained based on a ratio between peak intensity originated in Si—C bond and peak intensity originated in Si—Si bond. A description will be given more specifically. First, in measuring spectrum, AlKα-ray with an output of 25 W was used as an X-ray source. To obtain XPS spectrum of the anode active material bulk mainly composed of silicon, an oxide film covering the surface, an impurity such as C—C bond should be removed. Thus, Ar ion beam etching was performed to remove the oxide film and the impurity. As irradiation conditions of Ar ion beam, the accelerating voltage was 1 kV and the incidence angle was 45 deg. Sufficient removal of the oxide film was determined by sequentially measuring XPS spectrum until no change was observed. Sufficient removal of the impurity was determined based on a fact that peaks possibly originated in C—H bond and C—C bond observed in the vicinity of 284.5 eV were sufficiently decreased. Even if some impurity existed on the surface of the anode active material, it is possible to separate peak originated in Si—C bond. In the case where an impurity existed on the surface of the anode active material, in spectrum of 1s orbit of carbon (C1s), peak (a) possibly originated in C—H bond and C—C bond was observed in the vicinity of 284.5 eV, and peak (b) possibly originated in C—Si bond was observed in the vicinity of 282.5 eV. Further, in addition, peak possibly originated in C—O bond or the like was observed in the vicinity of 286.5 eV. To respectively separate the foregoing peaks, background subtraction with the use of Shirley function was performed, and peak fitting with the use of Gauss-Lorentz mixed function was performed. At this time, energy positions of tops of peak (a) and peak (b) were respectively 284.5 eV±0.5 ev and 282.5 eV±0.5 ev. By using the fitting results, peak areas a and b of the peak (a) and the peak (b) were respectively obtained. Energy correction of the horizontal axis of XPS spectrum was made so that the peak position of 1s orbit of carbon (C1s) became 284.5 eV. Thereby, the peak area b originated in Si—C bond was able to be separated. As silicon carbide, only a compound having a composition ratio of Si:C=1:1 (SiC) existed, and thus ratio between Si and C in peak of C—Si bond was regarded as 1:1. Further, peak (c) in 2p orbit of silicon (Si2p) observed in the vicinity of 99.1 eV was regarded as a peak originated in Si—Si bond, and peak area c thereof was obtained. Based on the ratio of the peak area b to the peak area C, a ratio existing as Si—C bond among silicon contained in the anode active material was obtained.

Further, each secondary battery after the charge and discharge cycle test was disassembled, and the carbon amount and the oxygen amount contained in each anode active material layer 162B was respectively measured by the following procedures. At that time, the anode active material layer 162B as a sample was cut out from a region not opposed to the cathode, that is, a region in which lithium is not inserted and from which lithium is not extracted. In the copper foil as the anode current collector 162A, inclusion of carbon and oxygen was not observed. Therefore, the composition in such a region may be similar to the film composition immediately after forming a film.

First, the carbon amount was measured by using carbon sulfur analyzer EMIA-520 of Horiba Ltd. Specifically, a sample (1.0 g) taken out from part of the anode active material layer 162B was burned in oxygen air current in a combustion furnace, $Co_2$, Co, and $SO_2$ generated were transferred and introduced into a nondispersive infrared detector by the oxygen air current and, and then each gas concentration of $Co_2$, Co, and $SO_2$ was detected and integrated and thereby the carbon content (wt %) was measured. In the nondispersive infrared detector, an alternating current signal is transmitted correspondingly to each gas concentration of $Co_2$, Co, and $SO_2$, and the alternating current signal is converted into a digital value, which is linearized and integrated by a microcomputer. After the integration, blank value correction and sample weight correction are made by a predetermined correction method, and then the carbon/sulfur content (wt %) is displayed.

Meanwhile, the oxygen amount was measured by using oxygen nitrogen analyzers EMGA-520 and EMGA-620 of Horiba Ltd. Specifically, first, a sample (50 mg or more) taken out from part of the anode active material layer 162B was put into a hot graphite crucible inside an extraction furnace retained in vacuum, heated, and thermally decomposed. As a result, O, N, and H in the sample were discharged outside as CO, $N_2$, and $H_2$. Each gas of CO, $N_2$, and $H_2$ was transferred into a nondispersive infrared detector and a thermal conductivity detector by career gas (He). CO was detected in the nondispersive infrared detector and $N_2$ was detected in the thermal conductivity detector. Thereby, the oxygen/nitrogen content (wt %) was measured. In the nondispersive infrared detector and the thermal conductivity detector, an alternating current signal is transmitted correspondingly to each concentration of detected gas (CO and $N_2$), the alternating current signal is converted into a digital value, which is linearized and integrated by a microcomputer. After the integration, blank value correction and sample weight correction are made by a predetermined correction method, and then the oxygen/nitrogen content (wt %) is displayed.

Further, the silicon content contained in the anode active material layer 162B formed on the anode current collector 162A was measured by an inductively-coupled plasma atomic emission spectrometer (ICP-AES). Based on the results of the foregoing measurements, the contents of carbon and oxygen contained in the anode active material layer 162B were calculated. The results are shown in Table 1 to Table 5 together.

As shown in Table 1 to Table 5, in these examples, in the anode active material, the carbon content was from 0.2 atomic % to 10 atomic % both inclusive, and the oxygen content was from 0.5 atomic % to 40 atomic % both inclusive. In addition, in these examples, a ratio from 0.1% to 17.29% both inclusive of silicon contained in the anode active material existed as Si—C bond. Thus, it was confirmed that in these examples, superior cycle characteristics were exhibited compared to the comparative examples. In particular, it was exhibited that in the case where the carbon content was from 0.4 atomic % to 5 atomic % both inclusive, and the oxygen content was from 3 atomic % to 25 atomic % both inclusive in the anode active material, superior cycle characteristics were exhibited. Further, as a whole, there was a tendency that if the carbon content was high, the ratio of silicon existing as Si—C bond was lowered, and if the oxygen content was high, the ratio of silicon existing as Si—C bond was increased.

Examples 2-1 to 2-6

Secondary batteries were fabricated in the same manner as that of Example 1, except that the anode active material layer 162B was formed into a multilayer structure including 10 layers in total in which 5 first layers and 5 second layers having an oxygen content different from each other were alternately layered. However, the contents of carbon and oxygen contained as an anode active material varied according to each example as shown in Table 6 described later.

The cycle characteristics were examined and bonding state of carbon contained in the anode active material (existence ratio as Si—C bond) were examined as well for the secondary batteries of Examples 2-1 to 2-6. Further, each secondary battery after the charge and discharge cycle test was disassembled, and the carbon amount and the oxygen amount contained in each anode active material layer 162B were respectively measured. The results are shown in Table 6.

TABLE 6

|  | Structure of anode active material layer | Carbon content (at %) | Oxygen content (at %) | Ratio of carbon existing as Si—C bond (%) | Cycle characteristics (%) |
| --- | --- | --- | --- | --- | --- |
| Example 1-21 | Single layer | 0.4 | 11.1 | 0.37 | 77 |
| Example 2-1 | Multilayer structure | 0.5 | 11.8 | 0.46 | 79 |
| Example 1-33 | Single layer | 4.7 | 11.0 | 4.35 | 78 |
| Example 2-2 | Multilayer structure | 4.8 | 11.1 | 4.39 | 80 |
| Example 1-39 | Single layer | 9.2 | 11.0 | 8.53 | 73 |
| Example 2-3 | Multilayer structure | 9.4 | 11.2 | 8.52 | 76 |
| Example 1-45 | Single layer | 2.5 | 5.0 | 2.14 | 79 |
| Example 2-4 | Multilayer structure | 2.6 | 5.4 | 2.15 | 81 |
| Example 1-49 | Single layer | 2.6 | 15.0 | 2.59 | 82 |
| Example 2-5 | Multilayer structure | 3.1 | 16.2 | 3.03 | 85 |
| Example 1-53 | Single layer | 2.6 | 24.8 | 3.01 | 80 |
| Example 2-6 | Multilayer structure | 2.7 | 25.0 | 3.02 | 84 |

As shown in Table 6, it was confirmed that in the case where the anode active material layer 162B was formed into a multilayer structure, higher cycle characteristics were obtained than in the case where the anode active material layer 162B was formed into a single layer structure. Further, there was a tendency that in the case of the multilayer structure, the ratio of silicon existing as Si—C bond was increased than in the case of the single layer structure.

Examples 3-1 to 3-10

Secondary batteries were fabricated in the same manner as that of Example 1, except that the composition of the electrolytic solution was changed. However, the contents of carbon and oxygen contained as an anode active material varied according to each example as shown in Table 7 described later. Further, in Examples 3-2, 3-4, 3-6, 3-8, and 3-10, the anode active material layer 162B was formed into a multilayer structure. Further, for the electrolytic solution, in Examples 3-1 and 3-2, a mixture of FEC and DEC at a weight ratio of 50:50 was used. In Examples 3-3 and 3-4, as an electrolytic solution, a mixture of FEC, DEC, and DFEC at a weigh ratio of 30:65:5 was used. In Examples 3-5 and 3-6, as an electrolytic solution, a mixture of FEC, DEC, and DFEC at a weight ratio of 30:65:5 (100 wt %) added with 1 wt % of sulfobenzoic anhydride (SBAH) was used. In Examples 3-7 and 3-8, as an electrolytic solution, a mixture of FEC, DEC, and DFEC at a weight ratio of 30:65:5 (100 wt %) added with 1 wt % of sulfopropionate anhydride (SPAH) was used. In Examples 3-9 and 3-10, as an electrolytic solution, a mixture of FEC, DEC, and DFEC at a weight ratio of 30:65:5 was used, and as an electrolyte salt, a mixture of 0.9 mol/dm$^3$ of LiPF$_6$ and 0.1 mol/dm$^3$ of LiBF$_4$ was used.

The cycle characteristics for the secondary batteries of Examples 3-1 to 3-10 were examined, and bonding state of carbon contained in the anode active material (existence ratio as Si—C bond) was examined as well. Further, each secondary battery after the charge and discharge cycle test was disassembled, and the carbon amount and the oxygen amount contained in each anode active material layer 162B was respectively measured. The results are shown in Table 7.

As shown in Table 7, in the examples in which FEC or DFEC was used as a solvent, a higher capacity retention ratio was obtained. Further, it was found out that an acid anhydride such as sulfobenzoic anhydride (SBAH) and sulfopropionate anhydride (SPAH) was contained, higher cycle characteristics were obtained. Further, in the case where LiBF$_4$ was used in addition to LiPF$_6$ as an electrolyte salt, the cycle characteristics were improved. That is, it was showed that in the case where boron and fluorine were contained in the electrolyte, higher effect was obtained. In all electrolytes, in the case where the anode active material layer 162B was formed into a multilayer structure, higher cycle characteristics were obtained.

The present invention has been described with reference to the embodiment and the examples. However, the present invention is not limited to the foregoing embodiment and the foregoing examples, and various modifications may be made. For example, in the foregoing embodiment and the foregoing examples, descriptions have been given of the cylindrical secondary battery, the laminated film secondary battery, and the square secondary battery respectively having the spirally wound battery element (electrode body) with reference to specific examples. However, the present invention is similarly applicable to a secondary battery with the package member in other shape such as a button type secondary battery and a coin type secondary battery, or a secondary battery with a battery element (electrode body) having other structure such as a laminated structure. Further, the present invention is applicable not only to the secondary batteries but also to primary batteries.

Further, in the foregoing embodiment and the foregoing examples, descriptions have been given of the case using lithium as an electrode reactant. However, the present invention is applicable to the case using other Group 1 element in the long period periodic table such as sodium (Na) and potassium (K), a Group 2 element in the long period periodic table such as magnesium and calcium (Ca), other light metal such as aluminum, or an alloy of lithium or the foregoing elements as well, and similar effect may be thereby obtained. For the anode active material capable of inserting and extracting the

TABLE 7

|  | Structure of anode active material layer | Carbon content (at %) | Oxygen content (at %) | Ratio of carbon existing as Si—C bond (%) | Cycle characteristics (%) |
|---|---|---|---|---|---|
| Example 1-49 | Single layer | 2.6 | 15.0 | 2.59 | 82 |
| Example 3-1 | Single layer | 2.6 | 15.0 | 2.59 | 85 |
| Example 3-2 | Multilayer structure | 3.1 | 16.2 | 3.03 | 88 |
| Example 3-3 | Single layer | 2.6 | 15.0 | 2.59 | 86 |
| Example 3-4 | Multilayer structure | 3.1 | 16.2 | 3.03 | 90 |
| Example 3-5 | Single layer | 2.6 | 15.0 | 2.59 | 88 |
| Example 3-6 | Multilayer structure | 3.1 | 16.2 | 3.03 | 92 |
| Example 3-7 | Single layer | 2.6 | 15.0 | 2.59 | 89 |
| Example 3-8 | Multilayer structure | 3.1 | 16.2 | 3.03 | 94 |
| Example 3-9 | Single layer | 2.6 | 15.0 | 2.59 | 87 |
| Example 3-10 | Multilayer structure | 3.1 | 16.2 | 3.03 | 90 | electrode reactant, the cathode active material, a solvent and the like are selected according to the electrode reactant.

The present application contains subject matter related to that disclosed in Japanese Priority Patent Application JP 2008-135804 filed in the Japanese Patent Office on May 23, 2008, the entire contents of which is hereby incorporated by reference.

It should be understood by those skilled in the art that various modifications, combinations, sub combinations and alternations may occur depending on design requirements and other factors insofar as they are within the scope of the appended claims or the equivalents thereof.

What is claimed is:

1. An anode comprising:
an anode current collector; and
an anode active material on the anode current collector, wherein,
the anode active material comprises a layer containing silicon, carbon, and oxygen,
an amount of carbon is from and including 0.2 atomic % to 10 atomic %,
an amount of oxygen is from and including 0.5 atomic % to 40 atomic %, and
a ratio of the amount of silicon in the anode active material to the amount of Si—C bond in the anode active material is from and including 0.1% to 17.29%.

2. The anode according to claim 1, the amount of carbon is from and including 0.4 atomic % to 5 atomic % and the amount of oxygen is from and including 3 atomic % to 25 atomic %.

3. The anode according to claim 1, wherein the anode active material layer comprises a multilayer structure, the multilayer structure includes at least one first layer and at least one second layer, and the amount of oxygen in the first layer is different from the amount of oxygen in the second layer.

4. The anode according to claim 1, wherein the anode active material layer is formed by electron beam heating evaporation method.

5. A secondary battery comprising:
a cathode;
an anode comprising an anode current collector and an anode active material layer thereon; and
an electrolyte,
wherein,
the anode active material layer includes silicon, carbon, and oxygen
the amount of carbon is from and including 0.2 atomic % to 10 atomic %,
the amount of oxygen is from and including 0.5 atomic % to 40 atomic %, and
a ratio of the amount of silicon in the anode active material to the amount of Si—C bond in the anode active material is from and including 0.1% to 17.29%.

6. The secondary battery according to claim 5, wherein the electrolyte contains a cyclic ester carbonate, or a chain ester carbonate with a least one fluorine substituent as a solvent.

7. The secondary battery according to claim 6, wherein the cyclic ester carbonate is 4,5-difluoro-1,3-dioxolane-2-one.

8. The secondary battery according to claim 5, wherein the electrolyte contains a solvent containing an acid anhydride.

9. The secondary battery according to claim 5, wherein the electrolyte contains a lithium compound containing boron and fluorine.

* * * * *